United States Patent
Colombo et al.

(10) Patent No.: US 12,000,971 B2
(45) Date of Patent: Jun. 4, 2024

(54) METHOD AND SYSTEM FOR SEISMIC PROCESSING USING VIRTUAL TRACE BINS BASED ON OFFSET ATTRIBUTES AND AZIMUTHAL ATTRIBUTES

(71) Applicant: SAUDI ARABIAN OIL COMPANY, Dhahran (SA)

(72) Inventors: Daniele Colombo, Dhahran (SA); Ernesto Sandoval-Curiel, Dhahran (SA); Diego Rovetta, Delft (NL); Apostolos Kontakis, Delft (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 25 days.

(21) Appl. No.: 17/647,799

(22) Filed: Jan. 12, 2022

(65) Prior Publication Data
US 2023/0184972 A1    Jun. 15, 2023

(30) Foreign Application Priority Data
Dec. 10, 2021 (GR) ................................ 20210100866

(51) Int. Cl.
*G01V 1/28* (2006.01)
*G01V 1/00* (2006.01)
*G01V 1/30* (2006.01)

(52) U.S. Cl.
CPC .............. *G01V 1/282* (2013.01); *G01V 1/003* (2013.01); *G01V 1/306* (2013.01)

(58) Field of Classification Search
CPC ......... G01V 1/282; G01V 1/003; G01V 1/306
See application file for complete search history.

(56) References Cited

U.S. PATENT DOCUMENTS 4,905,204 A    2/1990  Hughes
4,943,950 A *  7/1990  Beasley ................. G01V 1/301
                                                    367/54
(Continued)

FOREIGN PATENT DOCUMENTS

WO   WO-2017035104 A1 *  3/2017  ............. G01V 1/282
WO      2017/106127 A1    6/2017
(Continued)

OTHER PUBLICATIONS

Samuel H. Gray; "Gaussian beam migration of common-shot records", Geophysics; vol. 70; No. 4; Jul. 7, 2005; pp. S71-S77 (7 pages).
(Continued)

*Primary Examiner* — Yuqing Xiao
*Assistant Examiner* — Christopher Richard Walker
(74) *Attorney, Agent, or Firm* — Osha Bergman Watanabe & Burton LLP

(57) ABSTRACT

A method may include obtaining various seismic traces for a geological region of interest. The method may further include determining an offset attribute and an azimuthal attribute. The method may further include determining, using the offset attribute and the azimuthal attribute, a virtual trace bin for the geological region of interest. The method may further include generating a virtual trace using a subset of the seismic traces and corresponding to the virtual trace bin. The method may further include generating a velocity model for the geological region of interest using a virtual shot gather including the virtual trace and various virtual traces. A respective virtual trace among the virtual traces may correspond to a respective virtual trace bin among various virtual trace bins. The method may further include generating a seismic image of the geological region of interest using the velocity model.

16 Claims, 17 Drawing Sheets

(56) References Cited

U.S. PATENT DOCUMENTS

| | | | |
|---|---|---|---|
| 7,391,673 B2* | 6/2008 | Regone | G01V 1/3808 367/16 |
| 7,725,266 B2 | 5/2010 | Sirgue et al. | |
| 10,067,255 B2 | 9/2018 | Colombo et al. | |
| 10,222,497 B2 | 3/2019 | Nurijanyan et al. | |
| 10,267,937 B2* | 4/2019 | Hu | G01V 1/48 |
| 10,345,468 B2 | 7/2019 | Poole | |
| 10,386,519 B2* | 8/2019 | Colombo | G01V 1/362 |
| 10,436,927 B2 | 10/2019 | Sun et al. | |
| 10,884,146 B2 | 1/2021 | Bagaini et al. | |
| 11,105,946 B2 | 8/2021 | Abma et al. | |
| 2009/0279386 A1* | 11/2009 | Monk | G01V 1/3808 367/21 |
| 2010/0254220 A1* | 10/2010 | Tulett | G01V 1/42 367/57 |
| 2013/0028045 A1* | 1/2013 | Ferber | G01V 1/3826 367/16 |
| 2016/0320512 A1 | 11/2016 | Zhao et al. | |
| 2017/0160415 A1 | 6/2017 | Winnett et al. | |
| 2018/0321405 A1* | 11/2018 | Colombo | G01V 1/36 |
| 2018/0364383 A1* | 12/2018 | Ma | G06T 5/10 |
| 2019/0339405 A1* | 11/2019 | Bakulin | G01V 1/30 |
| 2021/0018639 A1 | 1/2021 | Sun et al. | |
| 2021/0049485 A1 | 2/2021 | Bosch Blumenfeld | |
| 2021/0190983 A1 | 6/2021 | Colombo et al. | |
| 2022/0373703 A1* | 11/2022 | Bekara | G01V 1/3808 |

FOREIGN PATENT DOCUMENTS

| | | | | |
|---|---|---|---|---|
| WO | WO-2020226506 A1 * | 11/2020 | | E21B 49/087 |
| WO | 2021/046114 A1 | 3/2021 | | |
| WO | 2021048597 A1 | 3/2021 | | |
| WO | 2021/127382 A1 | 6/2021 | | |

OTHER PUBLICATIONS

Su et al.; "High-resolution seismic processing technique with broadband, wide-azimuth, and high-density seismic data—A case study of thin-sand-reservoirs in eastern China", Interpretation; vol. 9. Issue 3; Aug. 1, 2021; pp. T833-T842 (10 pages).

Liu et al.; "The Azimuth Angle Domain Common Image Gathers Extraction by Kirchhoff Migration", SEG Technical Program Expanded Abstracts 2019; Aug. 10, 2019; pp. 4317-4321 (5 pages).

Du et al.; "FWI-driven High-fidelity Depth Imaging of a Large 3D Actic Seismic Survey, West Greenland", 76th EAGE Conference and Exhibition 2014; vol. 2014; Jun. 2014; pp. 1-5 (5 pages).

L. Casasanta and S. H. Gray, "Converted-wave beam migration with sparse sources or receivers", Geophysical Prospecting; vol. 63; Issue 3; May 2015; pp. 1-18 (18 pages).

International Search Report issued in PCT/US2022/052402 dated Mar. 24, 2023 (4 pages).

Written Opinion of the International Searching Authority issued in PCT/US2022/052402 dated Mar. 24, 2023 (7 pages).

\* cited by examiner

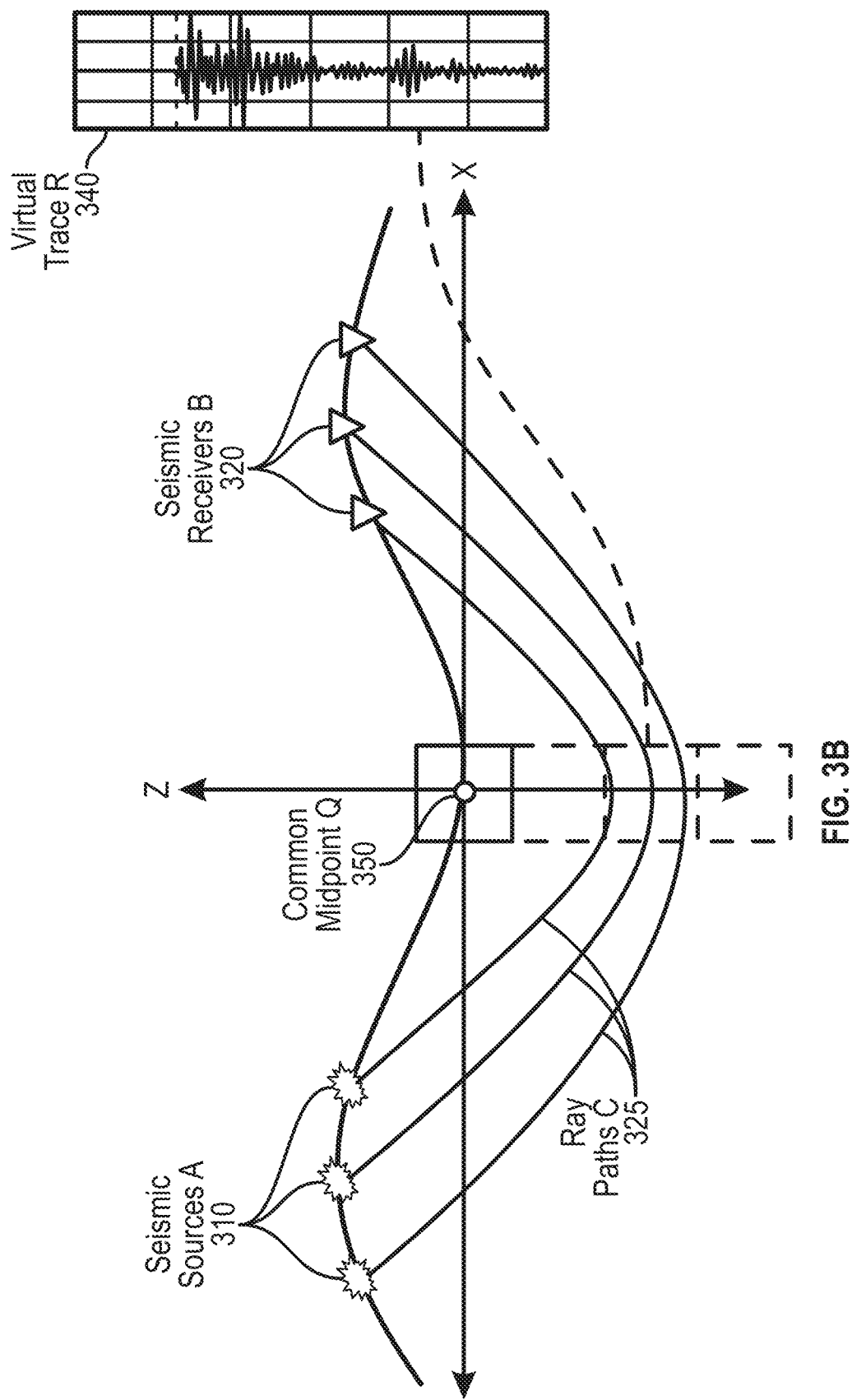

Summation Paths
LMO+Stack

Summation Paths
Slant Stack

METHOD AND SYSTEM FOR SEISMIC PROCESSING USING VIRTUAL TRACE BINS BASED ON OFFSET ATTRIBUTES AND AZIMUTHAL ATTRIBUTES

CROSS-REFERENCE TO RELATED APPLICATIONS

This application claims priority to Greek Patent Application Serial No. 20210100866, titled "METHOD AND SYSTEM FOR SEISMIC PROCESSING USING VIRTUAL TRACE BINS BASED ON OFFSET ATTRIBUTES AND AZIMUTHAL ATTRIBUTES," which was filed on Dec. 10, 2021, and is incorporated herein by reference.

BACKGROUND

Various seismic processing operations are performed on seismic data from a survey to convert time-based seismic data into a depth representation of a subsurface. For example, seismic processing operations may include surface multiple filtering and other noise removal operations. Likewise, seismic processing may also include application of seismic inversion techniques and migration algorithms to velocity models.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, various seismic traces for a geological region of interest. The method further includes determining, by the computer processor, an offset attribute and an azimuthal attribute. The method further includes determining, by the computer processor and using the offset attribute and the azimuthal attribute, a virtual trace bin for the geological region of interest. The method further includes generating, by the computer processor, a virtual trace using a subset of the seismic traces and corresponding to the virtual trace bin. The method further includes generating, by the computer processor, a velocity model for the geological region of interest using a virtual shot gather including the virtual trace and various virtual traces. A respective virtual trace among the virtual traces corresponds to a respective virtual trace bin among various virtual trace bins. The method further includes generating, by the computer processor, a seismic image of the geological region of interest using the velocity model.

In general, in one aspect, embodiments relate to a system that includes a seismic surveying system that also includes a seismic source and various seismic receivers. The system further includes a seismic interpreter that includes a computer processor. The seismic interpreter is coupled to the seismic surveying system. The seismic interpreter obtains various seismic traces for a geological region of interest. The seismic interpreter determines an offset attribute and an azimuthal attribute. The seismic interpreter determines, using the offset attribute and the azimuthal attribute, a virtual trace bin for the geological region of interest. The seismic interpreter generates a virtual trace using a subset of the seismic traces and corresponding to the virtual trace bin. The seismic interpreter generates a velocity model for the geological region of interest using a virtual shot gather that includes the virtual trace and various virtual traces. A respective virtual trace among the virtual traces corresponds to a respective virtual trace bin among various virtual trace bins. The seismic interpreter generates a seismic image of the geological region of interest using the velocity model.

In general, in one aspect, embodiments relate to a non-transitory computer readable medium storing instructions executable by a computer processor. The instructions obtain various seismic traces for a geological region of interest. The instructions determine an offset attribute and an azimuthal attribute. The instructions determine, using the offset attribute and the azimuthal attribute, a virtual trace bin for the geological region of interest. The instructions generate a virtual trace using a subset of the seismic traces and corresponding to the virtual trace bin. The instructions generate a velocity model for the geological region of interest using a virtual shot gather including the virtual trace and various virtual traces. A respective virtual trace among the virtual traces corresponds to a respective virtual trace bin among various virtual trace bins. The instructions generate a seismic image of the geological region of interest using the velocity model.

In some embodiments, an elevation correction is determined by the computer processor and using a first elevation value for a seismic receiver and a second elevation value for a seismic source. The seismic receiver and the seismic source may correspond to a seismic trace among the seismic traces. An adjusted seismic trace may be determined by the computer processor and based on the seismic trace and the elevation correction. A virtual trace may be generated using the adjusted seismic trace. In some embodiments, the elevation correction is a static correction based on vertical travel time path shift. In some embodiments, a reference data domain is determined by a computer processor, where the reference data domain may be a Radon domain or a wave-based data domain, and where the adjusted seismic trace may be corrected using the first elevation value and the second elevation value in the reference data domain. In some embodiments, a linear moveout (LMO) value is determined for a virtual trace bin, and a bin correction is determined using the LMO value. Various adjusted seismic traces may be determined using the bin correction and a subset of seismic traces, where a virtual trace is generated using the adjusted seismic traces. In some embodiments, various ray parameters are determined by a computer processor, where a respective ray parameter among the ray parameters may correspond to a respective seismic trace in a virtual trace bin. Various adjusted seismic traces may be determined using a linear Radon transform, the ray parameters, and a subset of various seismic traces, and where a virtual trace is generated using the adjusted seismic traces. In some embodiments, virtual trace bins are determined, where one virtual trace bin has an offset greater than another virtual trace bin, and where the virtual trace bins correspond to different subsets of various seismic traces. A size of the one virtual trace bin may be adjusted to produce a number of traces in a subset to match a number of traces in another subset for another virtual trace bin. In some embodiments, various weighted traces are determined based on a subset of seismic traces and a predetermined weight distribution, where the predetermined weight distribution may assign a larger weight value to a respective seismic trace among the subset closer to a beam center of a seismic survey. The predetermined weight distribution may have various weight values change based on a predetermined increment as a function of distance from the beam center, and where a virtual trace is based on stacking the weighted traces. In some embodiments, a second virtual trace bin and a third virtual trace bin are determined by a computer processor, where the second virtual trace bin corresponds to a second subset of various seismic traces that overlap at least one trace of a third subset of seismic traces corresponding to the third virtual trace bin. Various weighted traces may be determined based on the second subset of the seismic traces and a predetermined weight distribution, where the predetermined weight distribution may corresponds to Gaussian tapering. A virtual trace may be generated using the weighted traces. In some embodiments, a user input is obtained from a user device, where the user input may determine various overlapping traces between different subsets of seismic traces. In some embodiments, a presence of hydrocarbons are determined within the geological region of interest by a computer processor and using a velocity model.

In light of the structure and functions described above, embodiments of the invention may include respective means adapted to carry out various steps and functions defined above in accordance with one or more aspects and any one of the embodiments of one or more aspect described herein.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 1, 2, 3A, 3B, 4A, and 4B show systems in accordance with one or more embodiments.

DETAILED DESCRIPTION

Figure 1:
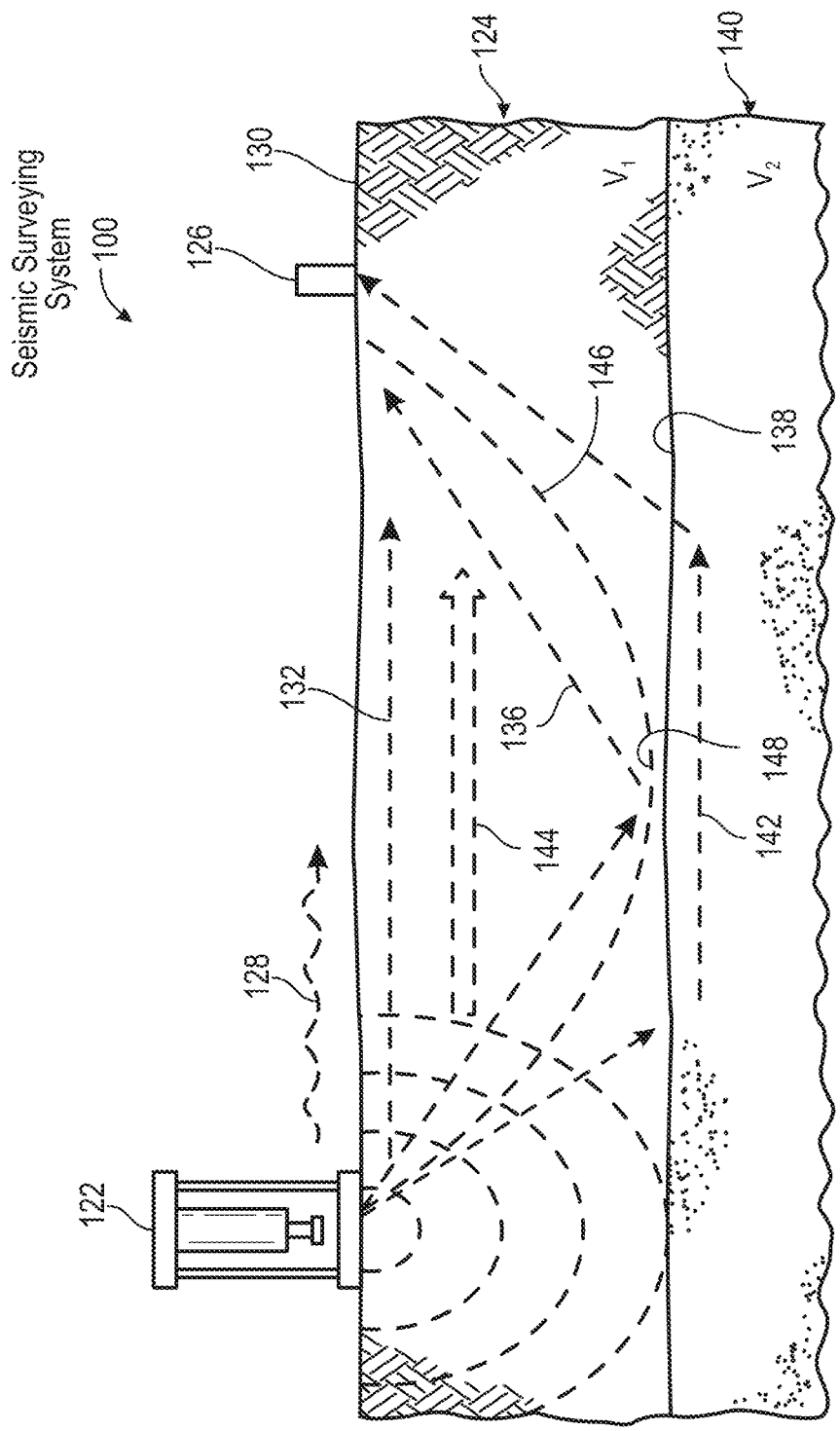

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for generating virtual traces for use in a seismic processing workflow (e.g., generating and/or updating velocity models as well as seismic imaging). In particular, a virtual trace may be a result of summing multiple seismic traces within a virtual trace bin to produce a stacked trace. More specifically, virtual trace bins may correspond to different sets of source-receiver pairs with a common midpoint (CMP). In some embodiments, for example, a virtual trace bin includes various seismic traces from a seismic survey based on a predetermined offset range (e.g., between two different offsets) from a common midpoint and a predetermined azimuth in relation to the common midpoint. In other words, rather than using seismic traces based on multiple CMPs to generate a special bream trace, only a single CMP may be used to generate virtual traces and perform virtual trace binning. Thus, a seismic survey acquisition geometry may be divided amongst multiple virtual trace bins for generating respective virtual traces. Using these virtual traces, a virtual shot gather can be generated for analyzing the subsurface and performing further seismic data processing.

Furthermore, some embodiments use virtual traces to enhance a signal-to-noise ratio (S/N) and generate a three-dimensional full waveform inversion (FWI) of a geological region. In particular, the use of virtual traces may be implemented within a 3D scheme to provide a seismic processing mechanism for complex geologies. In particular, some embodiments may retain the 3D spatial information in azimuthal binning that may not happen when seismic traces are approximated with a 1D virtual trace (i.e., input seismic traces span an entire 360 degrees). Using virtual trace bins based on azimuthal attributes, some embodiments may address various problems experienced by some FWI algorithms and processing techniques that suffer from complications and instabilities of the inversion process. Examples of such complications may include a non-uniqueness in the simulated solution, determining local minima rather than a global minimum, noise that affects the seismic processing results, numerical instability, and complex physics difficult to model.

In addition, several techniques are disclosed for addressing various challenges associated with processing virtual traces. For example, virtual trace bins may be adjusted using adaptive binning. For example, the size of offsets and azimuths may vary amongst different bins, such as to adjust seismic trace allocation (e.g., maintain a similar number of input seismic traces for generating respective virtual traces). In some embodiments, a seismic trace in an overlapping bin region may be used for generating multiple virtual traces. Likewise, seismic traces may be corrected for different factors, such as differences in elevation (i.e., an elevation correction) or different locations of seismic traces in a particular bin (i.e., a bin correction). Thus, seismic traces may be adjusted in the time domain or in a Radon domain using a slant stack approach to implement various corrections. Some corrections may be based on various seismic events, such as linear moveouts. Moreover, seismic traces may also be weighted for use in a virtual trace generation, such as though a weighting distribution that assigns greater weight to seismic traces proximate the center of a virtual trace bin.

Turning to FIG. 1, FIG. 1 shows a schematic diagram in accordance with one or more embodiments. As shown in FIG. 1, FIG. 1 illustrates a seismic surveying system (100) and various resultant paths of pressure waves (also called seismic waves). The seismic surveying system (100) includes a seismic source (122) that includes functionality for generating pressure waves, such as a reflected wave (136), diving wave A (142), or diving wave B (146), through a subsurface layer (124). Pressure waves generated by the seismic source (122) may travel along several paths through a subsurface layer (124) at a velocity $V_1$ for detection at a number of seismic receivers (126) along the line of profile. Likewise, velocity may refer to multiple velocities types, such as the two types of particle motions resulting from a seismic wave, i.e., velocity of the primary wave (P-wave) and a different velocity of the secondary wave (S-wave) through a particular medium. The seismic source (122) may be a seismic vibrator, such as one that uses a vibroseis technique, an air gun in the case of offshore seismic surveying, explosives, etc. The seismic receivers (126) may include geophones, hydrophones, accelerometers, and other sensing devices. Likewise, seismic receivers (126) may include single component sensors and/or multi-component sensors that measure pressure waves in multiple spatial axes.

As shown in FIG. 1, the seismic source (122) generates an air wave (128) formed by a portion of the emitted seismic energy, which travels above the earth's surface (130) to the seismic receivers (126). The seismic source (122) may also emit surface waves (132), which travel along the earth's surface (130). The speed of the surface waves (132), also called Rayleigh waves or ground roll, may correspond to a velocity typically slower than the velocity of a secondary wave. While the seismic surveying shown in FIG. 1 is a two-dimensional survey along a seismic profile along a longitudinal direction, other embodiments are contemplated, such as three-dimensional surveys.

Furthermore, subsurface layer (124) has a velocity $V_1$, while subsurface layer (140) has a velocity $V_2$. In words, different subsurface layers may correspond to different velocity values. In particular, a velocity may refer to the speed that a pressure wave travels through a medium, e.g., diving wave B (146) that makes a curvilinear ray path (148) through subsurface layer (124). Velocity may depend on a particular medium's density and elasticity as well as various wave properties, such as the frequency of an emitted pressure wave. Where a velocity differs between two subsurface layers, this seismic impedance mismatch may result in a seismic reflection of a pressure wave. For example, FIG. 1 shows a pressure wave transmitted downwardly from the seismic source (122) to a subsurface interface (138), which becomes a reflected wave (136) transmitted upwardly in response to the seismic reflection. The seismic source (122) may also generate a direct wave (144) that travels directly from the seismic source (122) at the velocity $V_1$ through the subsurface layer (124) to the seismic receivers (126).

Turning to refracted pressure waves, the seismic source (122) may also generate a refracted wave (i.e., diving wave A (142)) that is refracted at the subsurface interface (138) and travels along the subsurface interface (138) for some distance as shown in FIG. 1 until traveling upwardly to the seismic receivers (126). As such, refracted pressure waves may include diving waves (e.g., diving wave A (142), diving wave B (146)) that may be analyzed to map the subsurface layers (124, 140). For example, a diving wave may be a type of refracted wave that is continuously refracted throughout an earth's subsurface. Thus, a diving wave may be generated where velocities are gradually increasing with depth at a gradient. Likewise, the apex of a diving wave may be offset from a common midpoint (CMP) in contrast to reflected seismic energy. Though, for analysis purposes, an apex (or turning point) of a diving wave may be regarded as a common midpoint for the refracted energy. As such, the apex may serve as the basis for organizing and sorting a seismic survey dataset.

Furthermore, in analyzing seismic data acquired using the seismic surveying system (100), seismic wave propagation may be approximated using rays. For example, reflected waves (e.g., reflected wave (136)) and diving waves (e.g., diving waves (142, 146)) may be scattered at the subsurface interface (138). In FIG. 1, for example, the diving wave B (146) may exhibit a ray path of a wide angle that resembles a reflected wave in order to map the subsurface. Using diving waves, for example, a velocity model for an underlying subsurface may be generated that describes the velocity of different regions in different subsurface layers. An initial velocity model may be generated by modeling the velocity structure of media in the subsurface using an inversion of seismic data, typically referred to as seismic inversion. In seismic inversion, a velocity model is iteratively updated until the velocity model and the seismic data have a minimal amount of mismatch, e.g., the solution of the velocity model converges to a minimum that satisfies a predetermined criterion. For example, the optimization algorithm may be "linearized" and, while achieving a "minimum", there may be no guarantee that the solution is a global minimum rather than a local minimum. Thus, it may be a simplification commonly adapted in solving inverse problems that works when a respective objective function is convex.

With respect to velocity models, a velocity model may map various subsurface layers based on velocities in different layer sub-regions (e.g., P-wave velocity, S-wave velocity, and various anisotropic effects in the sub-region). For example, a velocity model may be used with P-wave and S-wave arrival times and arrival directions to locate seismic events. Anisotropy effects may correspond to subsurface properties that cause pressure waves to be directionally dependent. Thus, seismic anisotropy may correspond to various parameters in geophysics that refers to variations of wave velocities based on direction of propagation. One or more anisotropic algorithms may be performed to determine anisotropic effects, such as an anisotropic ray-tracing location algorithm or algorithms that use deviated-well sonic logs, vertical seismic profiles (VSPs), and core measurements. Likewise, a velocity model may include various velocity boundaries that define regions where rock types changes, such as interfaces between different subsurface layers. In some embodiments, a velocity model is updated using one or more tomographic updates to adjust the velocity boundaries in the velocity model.

Figure 2:
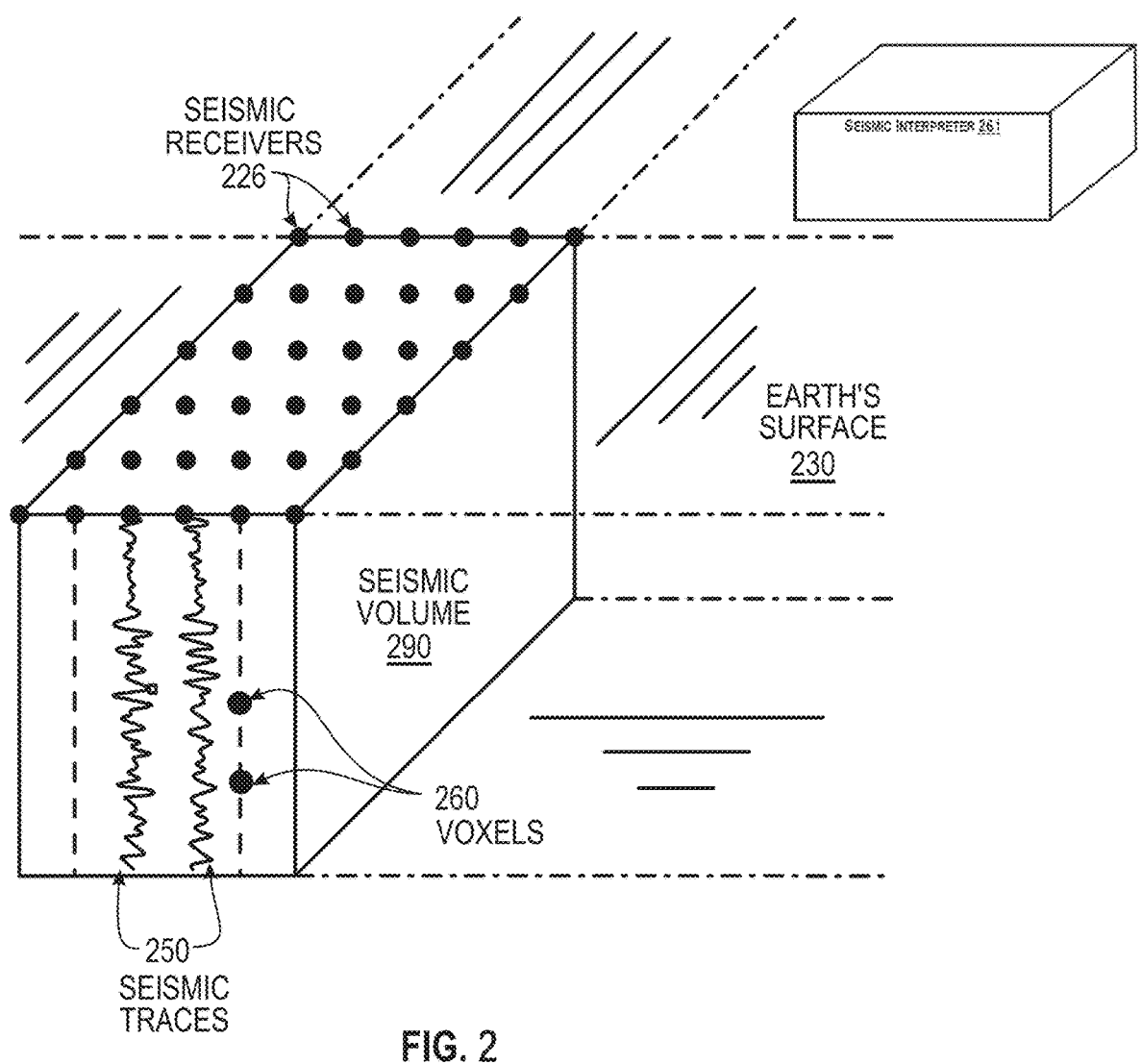

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (230). More specifically, a seismic volume (290) may be a cubic dataset of seismic traces. In particular, seismic data may have up to four spatial dimensions, one temporal dimension (i.e., related to the actual measurements stored in the traces), and possibly another temporal dimension related to time-lapse seismic surveys. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a three-dimensional array of seismic receivers (226) are disposed along the earth's surface (230) and acquire seismic data in response to various pressure waves emitted by seismic sources. Within the voxels (260), statistics may be calculated on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Seismic data may refer to raw time domain data acquired from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some contexts, seismic data may also refer to depth data or image data. Likewise, seismic data may also refer to processed data, e.g., using a seismic inversion operation, to generate a velocity model of a subterranean formation, or a migrated seismic image of a rock formation within the earth's surface. Seismic data may also be pre-processed data, e.g., arranging time domain data within a two-dimensional shot gather.

Furthermore, seismic data may include various spatial coordinates, such as (x,y) coordinates for individual shots and (x,y) coordinates for individual receivers. As such, seismic data may be grouped into common shot or common receiver gathers. In some embodiments, seismic data is grouped based on a common domain, such as common midpoint (i.e., Xmidpoint=(Xshot+Xrec)/2, where Xshot corresponds to a position of a shot point and Xrec corresponds to a position of a seismic receiver) and common offset (i.e., Xoffset=Xshot-Xrec).

In some embodiments, seismic data is processed to generate one or more seismic images. For example, seismic imaging may be performed using a process called migration. In some embodiments, migration may transform pre-processed shot gathers from a data domain to an image domain that corresponds to depth data. In the data domain, seismic events in a shot gather may represent seismic events in the subsurface that were recorded in a field survey. In the image domain, seismic events in a migrated shot gather may represent geological interfaces in the subsurface. Likewise, various types of migration algorithms may be used in seismic imaging. For example, one type of migration algorithm corresponds to reverse time migration. In reverse time migration, seismic gathers may be analyzed by: 1) forward modelling of a seismic wavefield via mathematical modelling starting with a synthetic seismic source wavelet and a velocity model; 2) backward propagating the seismic data via mathematical modelling using the same velocity model; 3) cross-correlating the seismic wavefield based on the results of forward modeling and backward propagating; and 4) applying an imaging condition during the cross-correlation to generate a seismic image at each time step. The imaging condition may determine how to form an actual image by estimating cross-correlation between the source wavefield with the receiver wavefield under the basic assumption that the source wavefield represents the downgoing wave-field and the receiver wave-field the up-going wave-field. In Kirchhoff and beam methods, for example, the imaging condition may include a summation of contributions resulting from the input data traces after the traces have been spread along portions of various isochrones (e.g., using principles of constructive and destructive interference to form the image).

Furthermore, seismic data processing may include various seismic data functions that are performed using various process parameters and combinations of process parameter values. For example, a seismic interpreter may test different parameter values to obtain a desired result for further seismic processing. Depending on the seismic data processing algorithm, a result may be evaluated using different types of seismic data, such as directly on processed gathers, Normal Move Out (NMO) corrected stacks of those gathers, or on migrated stacks using a migration function. Where structural information of the subsurface is being analyzed, migrated stacks of data may be used to evaluate seismic noise that may overlay various geological boundaries in the subsurface, such as surface multiples (e.g., strong secondary reflections that are detected by seismic receivers). As such, migrated images may be used to determine impact of noise removal processes, while the same noise removal processes may operate on gather data.

Keeping with seismic imaging, seismic imaging may be near the end of a seismic data workflow before an analysis by a seismic interpreter. The seismic interpreter may subsequently derive understanding of the subsurface geology from one or more final migrated images. In order to confirm whether a particular seismic data workflow accurately models the subsurface, a normal moveout (NMO) stack may be generated that includes various NMO gathers with amplitudes sampled from a common midpoint (CMP). In particular, a NMO correction may be a seismic imaging approximation based on calculating reflection travel times. However, NMO-stack results may not indicate an accurate subsurface geology, where the subsurface geology is complex with large heterogeneities in velocities or when a seismic survey is not acquired on a horizontal plane. Ocean-Bottom-Node surveys and rough topographic land seismic surveys may be examples where NMO-stack results fail to depict subsurface geologies.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions.

Turning to the seismic interpreter (261), a seismic interpreter (261) (also called a "seismic processing system") may include hardware and/or software with functionality for storing the seismic volume (290), well logs, core sample data, and other data for seismic data processing, well data processing, and other data processes accordingly. In some embodiments, the seismic interpreter (261) may include a computer system that is similar to the computer (1402) described below with regard to FIG. 14 and the accompanying description. While a seismic interpreter may refer to one or more computer systems that are used for performing seismic data processing, the seismic interpreter may also refer to a human analyst performing seismic data processing in connection with a computer. While the seismic interpreter (261) is shown at a seismic surveying site, in some embodiments, the seismic interpreter (261) may be remote from a seismic surveying site.

In some embodiments, one or more seismic inversion processes perform a stacking function of seismic traces (e.g., "averaging" multiple traces) that share a common midpoint (i.e., CMP) and a common source-receiver offset (e.g., in an XYO domain or an XYOA domain) to produce one or more virtual traces (also referred to as "beam traces" or "B-traces"). For example, these virtual traces may enhance a signal-to-noise ratio (S/N) for generating a more accurate velocity model. The stacked data may be obtained using seismic data that is volumetrically averaged (i.e., trace stacking) using a reference point, such as a CMP position. In some embodiments, trace stacking is performed within a full 3D scheme using an additional azimuthal sorting domain. This sorting domain for stacking traces may also be referred to as a common midpoint-offset-azimuth domain (i.e., an XYOA domain). Using multiple virtual traces, one or more virtual shot gathers (VSGs) may be generated for a three-dimensional geological region for analyzing the subsurface.

Figure 3A:
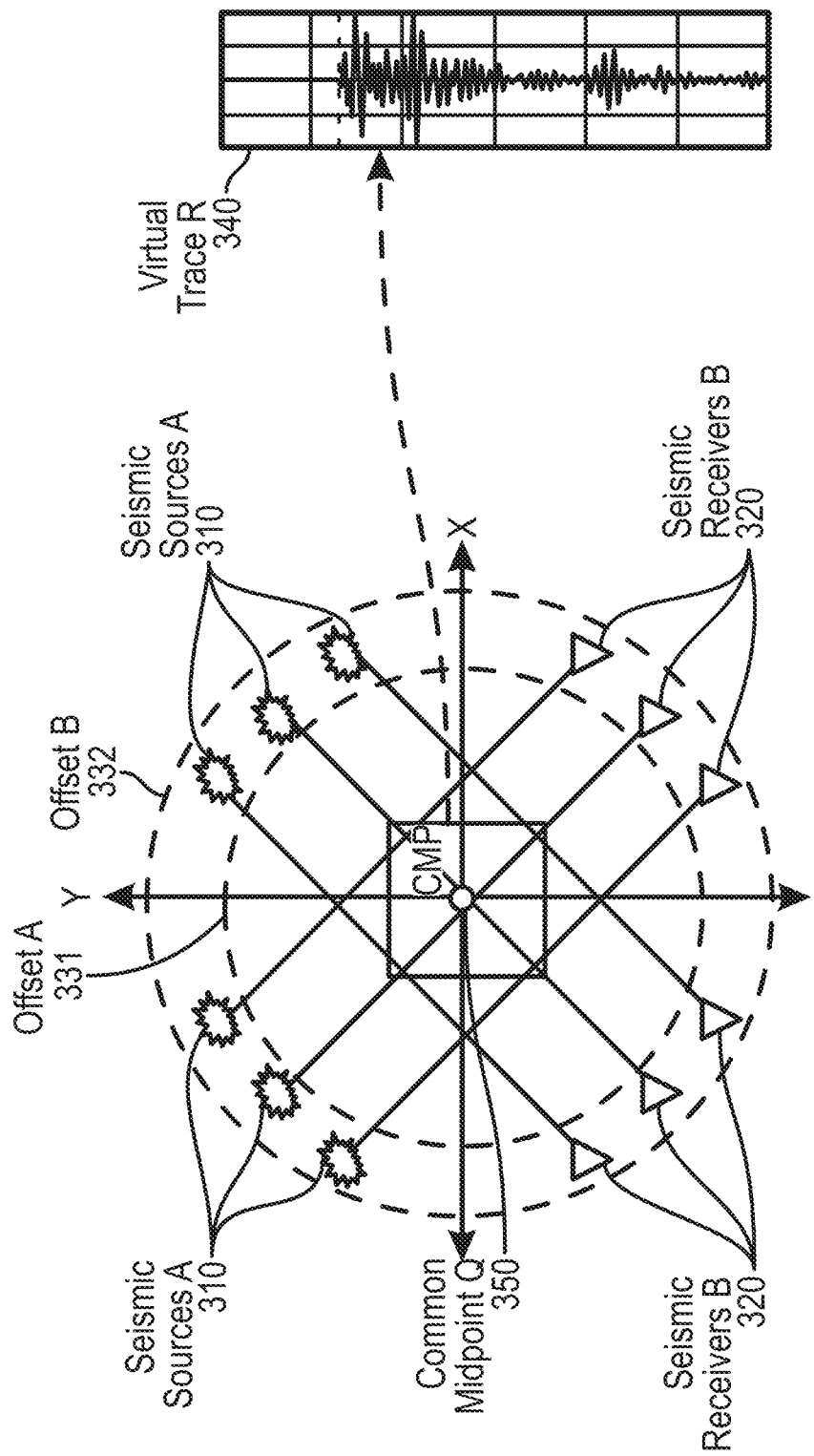

Turning to FIGS. 3A and 3B, FIGS. 3A and 3B show schematic diagrams in accordance with one or more embodiments. In FIG. 3A, trace stacking is shown using an XYO domain. In particular, a virtual trace R (340) is generated using seismic sources A (310) and seismic receivers B (320) located in a virtual trace bin between offset A (331) and offset B (332) from a common midpoint Q (350). Here, the virtual trace R (340) is identified based on position coordinates for a particular offset (i.e., $cmp_x$, $cmp_y$, offset) In particular, refracted waves (or diving waves) may be assumed to have a common refraction midpoint (or turning point for diving waves). Using XYO sorting and virtual trace generation, a common midpoint (e.g., common midpoint Q (350)) may be defined by an interval distance (or bin, class, etc.) in X-Y coordinates to define a virtual trace bin with various offset attributes, e.g. between offset A (331) and offset B (332). Seismic traces having these characteristics may be stacked, averaged, or otherwise statistically evaluated (e.g., median or mode metric) to generate a virtual trace for the respective virtual trace bin. In FIG. 3B, various refracted waves (i.e., diving waves corresponding to ray paths C (325)) correspond to a class of offsets related to a certain depth of penetration of the pressure waves. As such, FIG. 3B illustrates a cross-section of FIG. 3A.

Figure 4A:
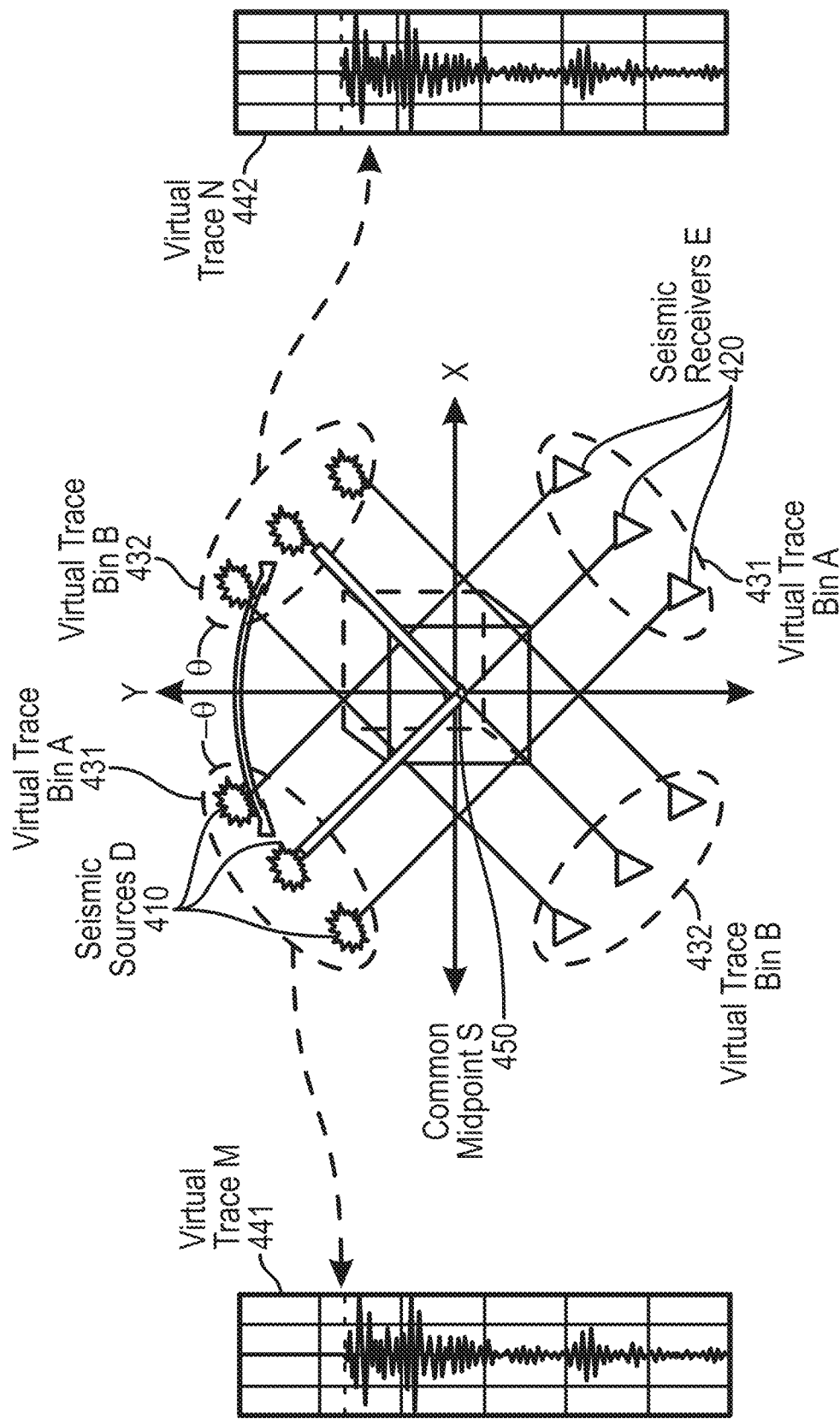
Figure 4B:
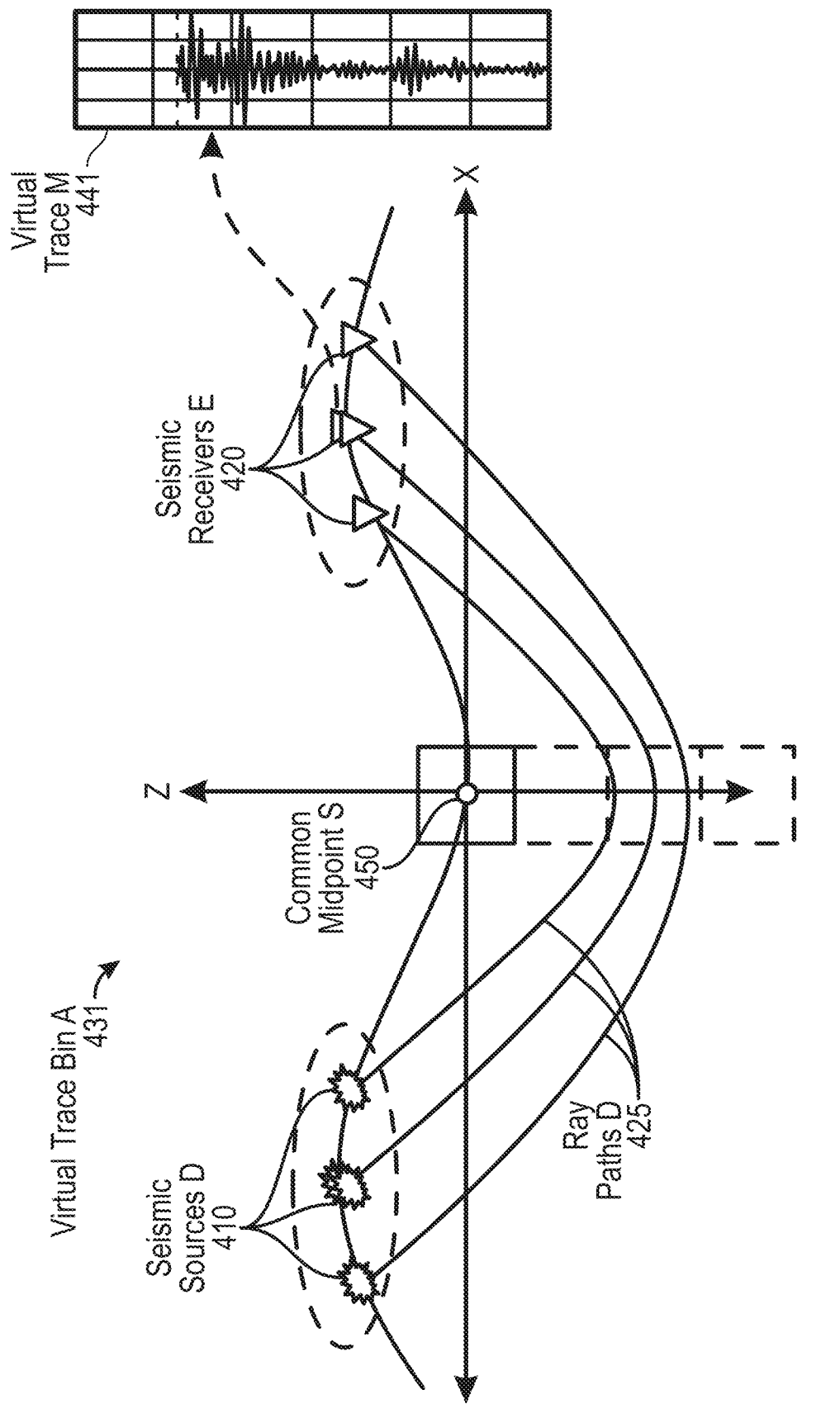

Turning to FIGS. 4A and 4B, FIGS. 4A and 4B show schematic diagrams in accordance with one or more embodiments. In FIG. 4A, a seismic survey is shown divided into multiple virtual trace bins (i.e., virtual trace bin A (431), virtual trace bin B (432)) for multiple virtual traces (i.e., virtual trace M (441), virtual trace N (442)). In particular, a virtual trace M (441) is generated using seismic sources D (410) and seismic receivers E (420) located in a virtual trace bin A (431) based on a common midpoint S (450). In contrast to FIGS. 3A and 3B, an azimuthal component θ is used to generate the virtual trace bins (431, 432) such that the virtual trace bins (431, 432) are azimuthal bins in an XYOA sorted domain. In FIG. 4B, various refracted waves (i.e., diving waves corresponding to ray paths D (425)) correspond to seismic traces within virtual trace bin A (431) based on a certain depth of penetration of the pressure waves. As such, FIG. 4B illustrates a cross-section of virtual trace bin A (431) in FIG. 4A.

Keeping with FIGS. 4A and 4B, the azimuthal attributes θ may be dense enough (e.g., the seismic data is acquired using high fold and full azimuthal coverage seismic surveys) to generate virtual shot gathers (which may also be referred to as Azimuthal Virtual Super Gathers (AVSGs)). By using virtual traces based on virtual trace bins with an azimuthal attribute, a full 3D propagation problem may be analyzed within a seismic inversion process. On the other hand, virtual shot gathers based on azimuthal attributes may still benefit from surface-consistent preconditioning and retain various 3D spatial relations for the virtual traces. Thus, XYOA binning/sorting may produce virtual traces that a represent a beam of seismic energy propagating from a virtual binned source to a virtual binned receiver position. The coordinates of a virtual trace may be the spatial coordinates of a center of a respective virtual bin (i.e., a corresponding center of an XYOA bin within a seismic survey).

Figure 5:
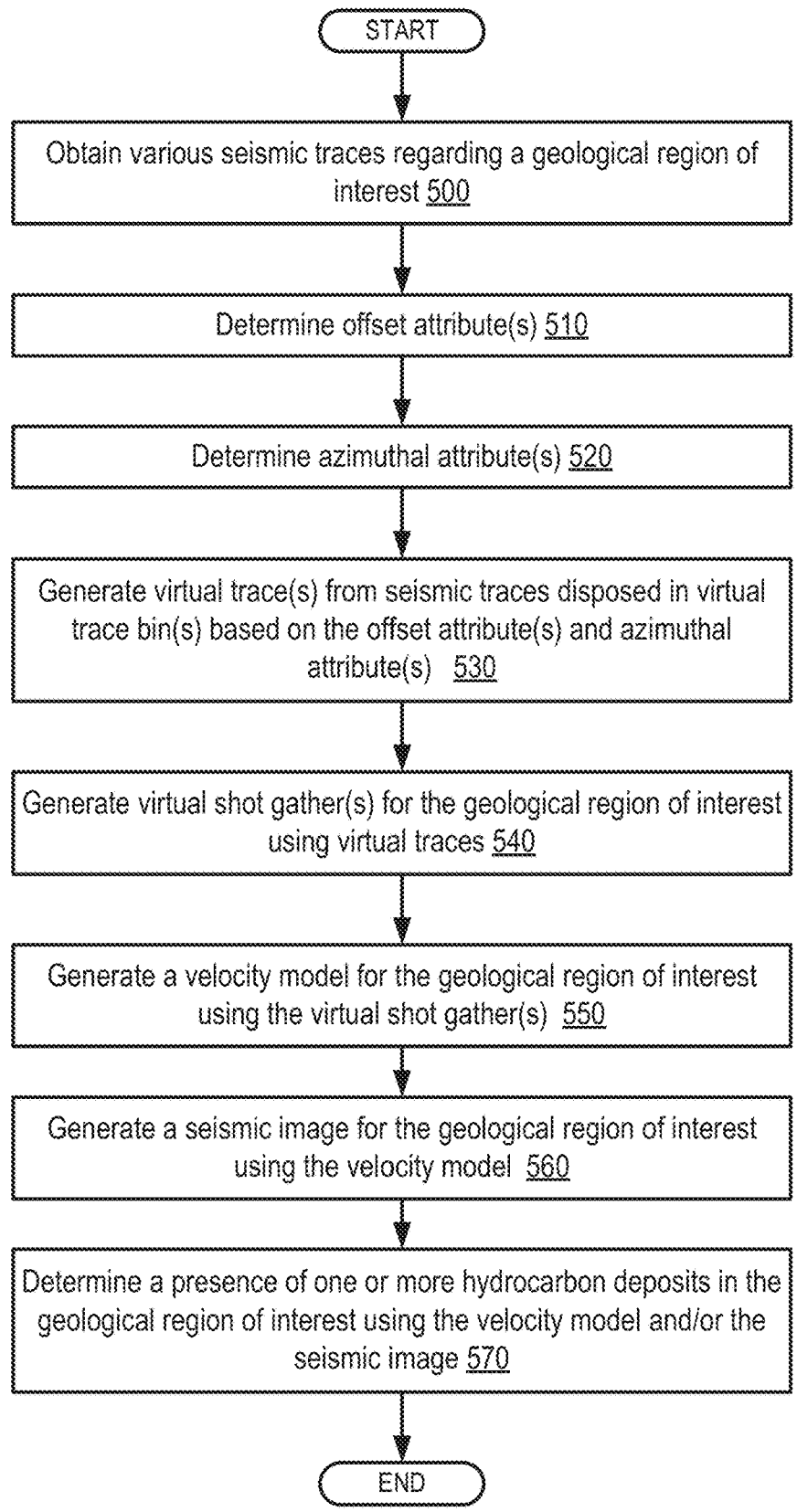
FIG. 5 shows a flowchart in accordance with one or more embodiments.

Turning to FIG. 5, FIG. 5 shows a flowchart in accordance with one or more embodiments. Specifically, FIG. 5 describes a general method for generating virtual traces using various virtual trace bins. One or more blocks in FIG. 5 may be performed by one or more components (e.g., seismic interpreter (261)) as described in FIGS. 1, 2, 3A, 3B, 4A, and 4B. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, various seismic traces are obtained regarding a geological region of interest in accordance with one or more embodiments. The seismic traces may be a portion of a seismic volume acquired using a seismic survey. The seismic traces may be similar to the seismic traces described in FIGS. 1, 2, 3A, 3B, 4A, and 4B and the accompanying description. Furthermore, a geological region of interest may be a portion of a geological area or volume that includes one or more formations of interest desired or selected for analysis, e.g., for determining location of hydrocarbons or reservoir development purposes.

In Block 510, one or more offset attributes are determined in accordance with one or more embodiments. For example, a distance from a common midpoint may be divided into various offset bins that correspond to different offset ranges. Thus, an offset attribute may define offset values (e.g., offset A (331) and offset B (332) in FIG. 3A) for a particular virtual trace bin within a seismic survey.

In Block 520, one or more azimuthal attributes are determined in accordance with one or more embodiments. For example, a complete 360 degree azimuth may be divided into various azimuthal bins that correspond to different azimuth angles centered on a common midpoint. Thus, an azimuthal attribute may define azimuthal values (e.g., 30 degrees or 60 degrees) for a particular virtual trace bin within a seismic survey.

In Block 530, one or more virtual traces are generated from various seismic traces disposed in one or more virtual trace bins based on one or more offset attributes and one or more azimuthal attributes in accordance with one or more embodiments. A virtual trace bin may be a combination of an azimuthal bin and an offset bin. As such, a seismic survey geometry may be divided into various virtual trace bins based on azimuthal values and offset values. Furthermore, various virtual traces may be generated using various processing techniques and sorting domains. For example, seismic traces may be processed in the time domain (i.e., seismic traces as shown in FIG. 2), in a frequency domain, or the Laplace-Fourier (i.e., complex frequency) domain. Moreover, various stacking methods may be used for generating virtual traces, such as using weighting algorithms to determine how different input traces contribute to the final virtual trace. For more information on using virtual trace bins to generate virtual traces, see FIGS. 3A, 3B, 4A, 4B, 6A and 6B and the accompanying description.

In some embodiments, various techniques may be used to preprocess seismic traces for input to a virtual trace generation process. For example, elevation corrections may be applied in order to account for differences in elevation between sources and receivers for respective seismic traces. Additionally, bin corrections may be used to correct for differences in offsets from a center of a virtual trace bin. Additional sorting techniques may be performed such as repartitioning the virtual trace bins based on the number of seismic traces in each bin. For more information on these processing techniques, see FIGS. 7 and 10 and the accompanying description.

Figure 6A:
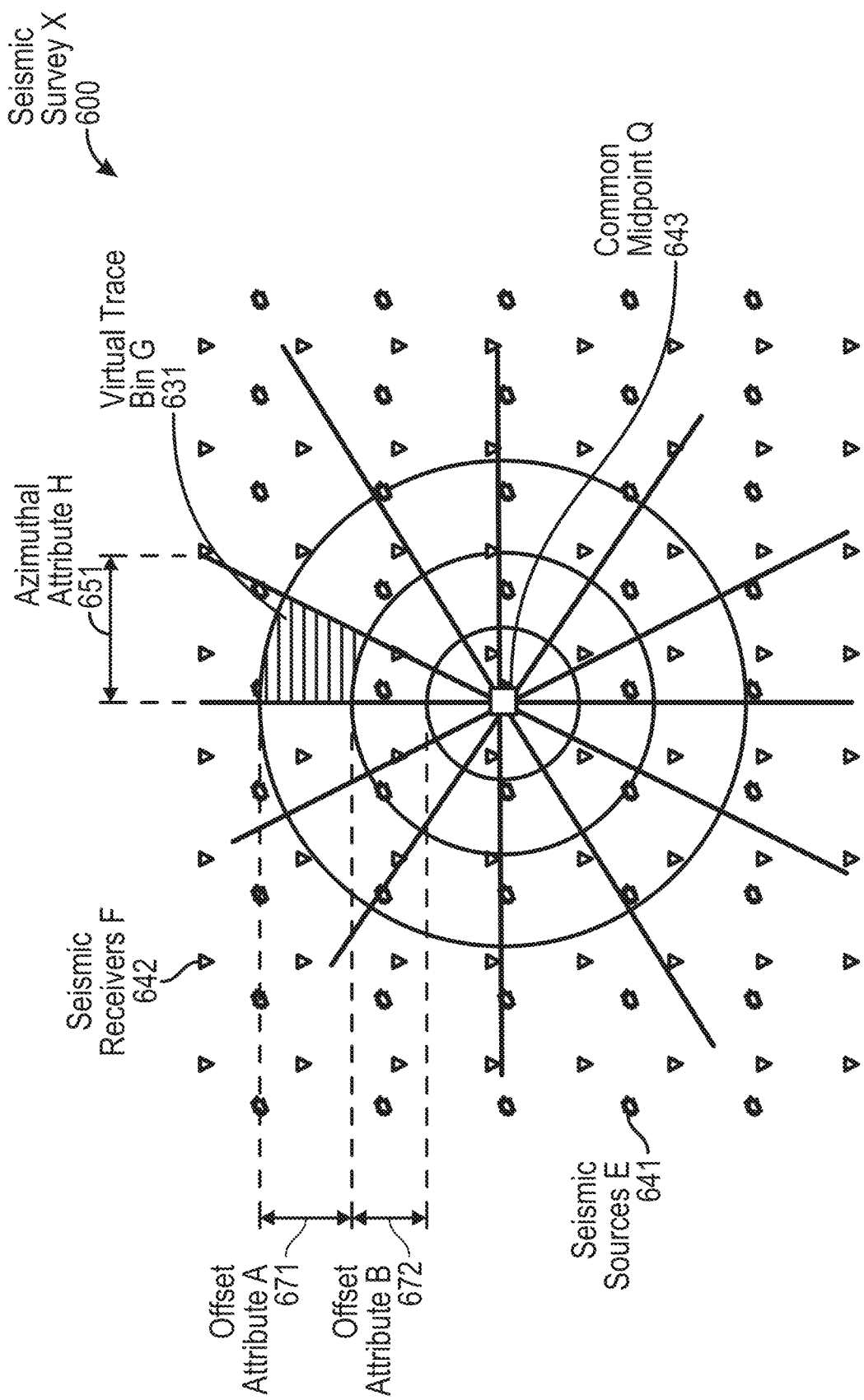
FIGS. 6A and 6B show examples in accordance with one or more embodiments.
Figure 6B:
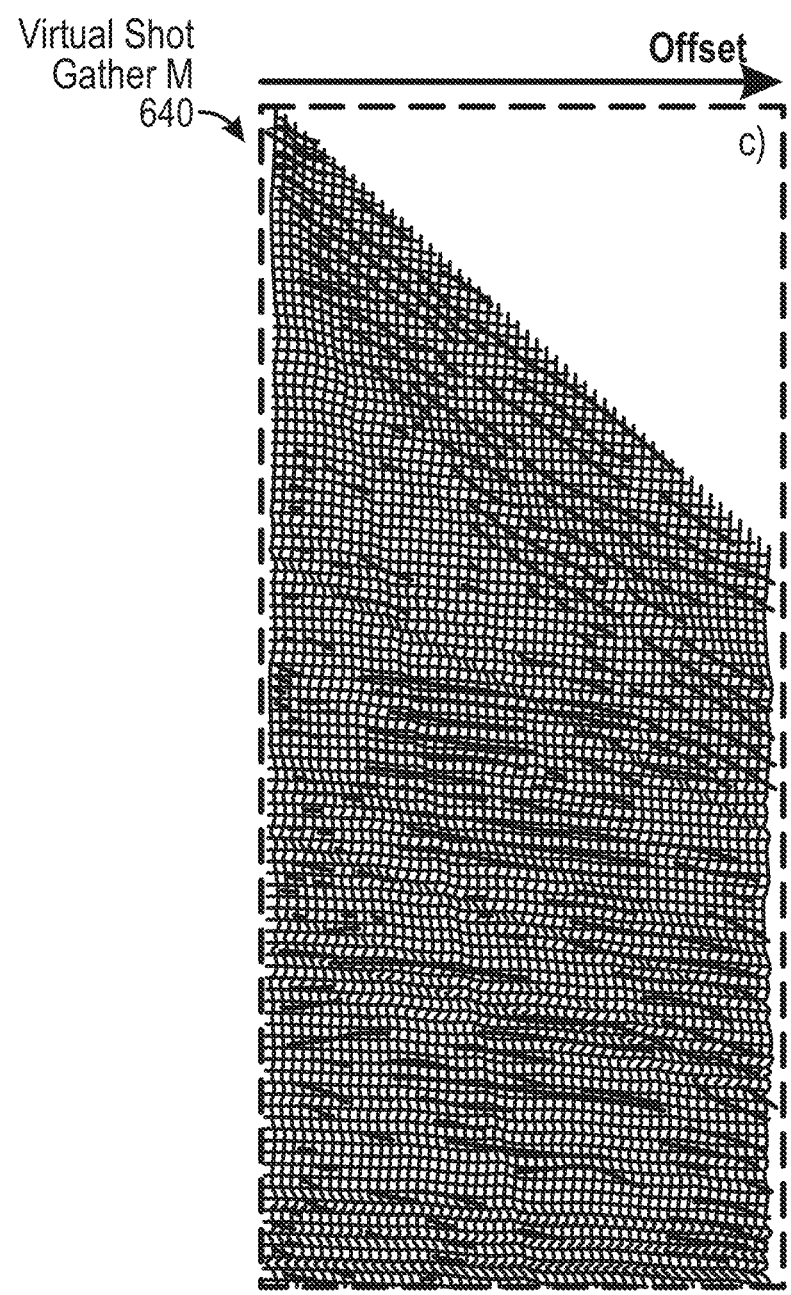

Turning to FIGS. 6A and 6B, FIGS. 6A and 6B shows schematic diagrams in accordance with some embodiments. In FIG. 6A, a seismic survey X (600) includes seismic receivers F (642) and seismic sources E (641). In particular, multiple virtual trace bins (e.g., virtual trace bin G (631)) are defined using offset attributes (e.g., offset attribute A (671), offset attribute B (672)) and azimuthal attributes (e.g., azimuthal attribute H (651)) around a common midpoint Q (643) (e.g., virtual trace bin G (631) corresponds to azimuthal attribute H (651) and offset attribute A (671)). Thus, various virtual trace bins are used to stack seismic traces within the respective virtual trace bin.

Keeping with FIG. 6A, FIG. 6A illustrates an example 3D cross-spread acquisition geometry that is characterized by seismic source lines and receiver lines positioned in an orthogonal pattern. As shown, a pattern of seismic sources and receivers is sampled or partitioned for various virtual trace bins (e.g., an XYOA bin). As such, an individual virtual trace bin identifies a sector that produces a virtual trace that may maintain the spatial coordinates of the center of the bin. Also, in FIG. 6A, the virtual traces are represented by virtual trace bins that only show positive offsets as the traces and receivers are approximately reciprocal, such that their positions may be swapped. In FIG. 6B, the virtual traces are then used to produce virtual shot gather M (640). A virtual shot gather may be generated using virtual trace bins that provide a mechanism for generating a beam of seismic energy without compromising various 3D spatial relations of sources and receivers.

Figure 12:
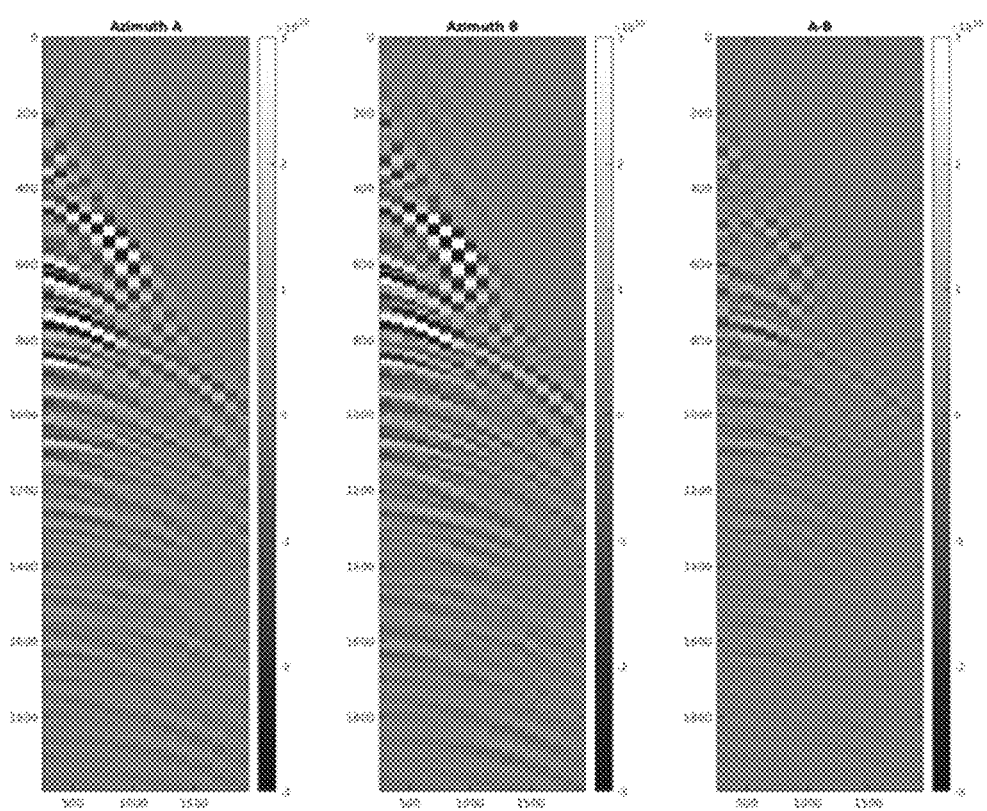

In Block 540, one or more virtual shot gathers are generated for a geological region of interest using various virtual traces in accordance with one or more embodiments. In particular, multiple virtual traces may be combined into a single gather to form a virtual shot gather. Subsequently, the virtual shot gather may be used for a velocity analysis for seismic data processing and hyperbolic moveout corrections. More specifically, a virtual shot gather may provide information about the velocity of propagation of various seismic waves. FIG. 12 provides an example of a virtual shot gather for different azimuth values and their arithmetic difference.

In Block 550, a velocity model is generated for a geological region of interest using one or more virtual shot gathers in accordance with one or more embodiments.

In Block 560, a seismic image is generated for a geological region of interest using a velocity model in accordance with one or more embodiments. For example, a set of migrated gathers may be summed or stacked to produce a final seismic image. In some embodiments, the seismic image provides a spatial and depth illustration of a subsurface formation for various practical applications, such as predicting hydrocarbon deposits, predicting wellbore paths for geosteering, etc.

In Block 570, a presence of one or more hydrocarbon deposits are determined in a geological region using a velocity model and/or a seismic image in accordance with one or more embodiments.

Figure 7:
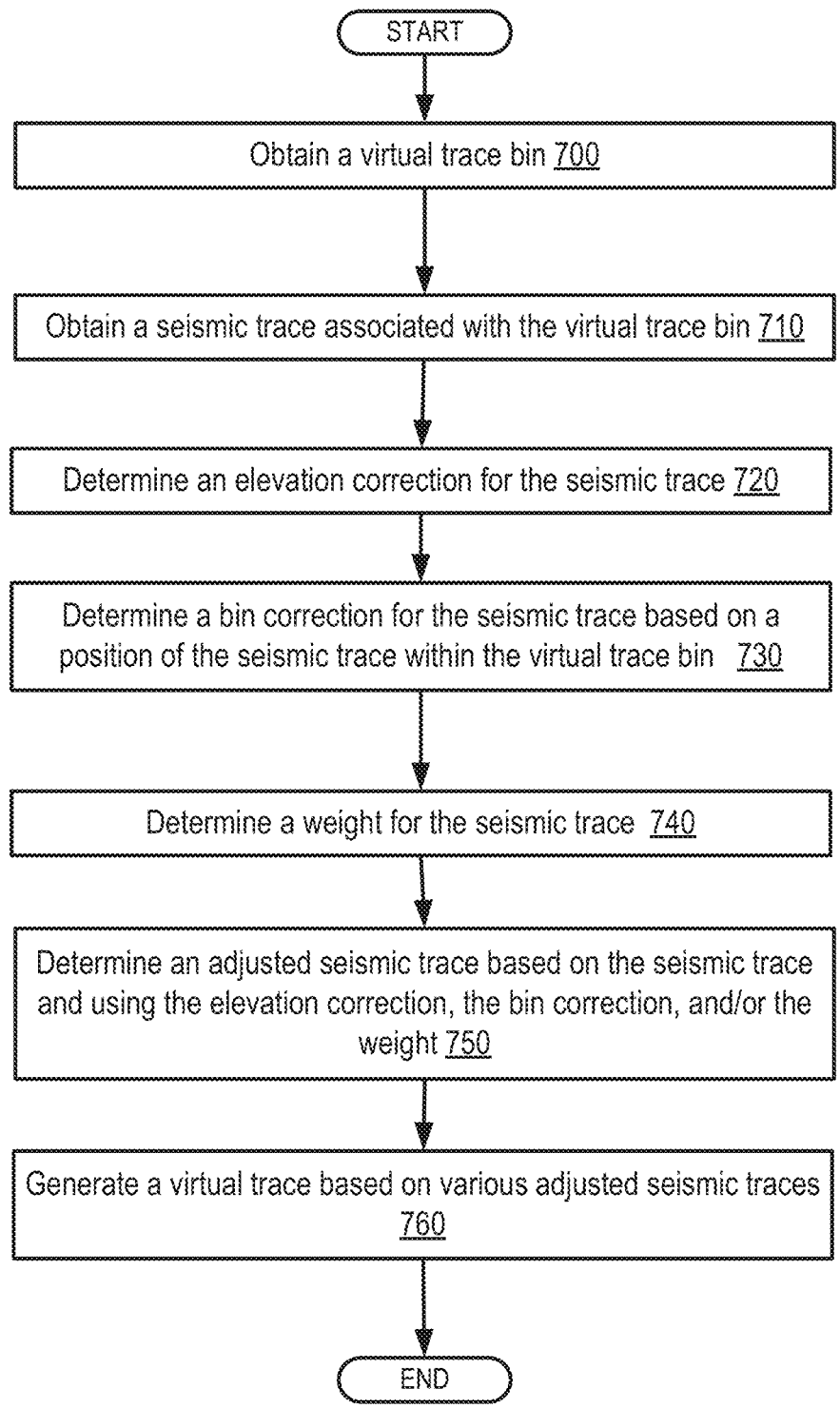
FIG. 7 shows a flowchart in accordance with one or more embodiments.

Turning to FIG. 7, FIG. 7 shows a flowchart in accordance with one or more embodiments. Specifically, FIG. 7 describes a specific method for correcting and/or adjusting seismic traces for generating virtual traces. One or more blocks in FIG. 7 may be performed by one or more components (e.g., seismic interpreter (261)) as described in FIGS. 1, 2, 3A, 3B, 4A, and 4B. While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 700, a virtual trace bin is obtained in accordance with one or more embodiments. For example, a virtual trace bin may correspond to an azimuthal attribute and an offset attribute, e.g., as determined by a user input to a user device. For more information on virtual trace bins, see FIGS. 4A, 4B, 5, 6A, and 6B above and the accompanying description.

In Block 710, a seismic trace is obtained that is associated with a virtual trace bin in accordance with one or more embodiments. For example, a seismic interpreter may automatically assign different seismic traces to corresponding virtual trace bins. In particular, a seismic interpreter may use the position information associated with a respective trace to determine which virtual trace bin is associated with the respective trace. The seismic trace may be obtained from a seismic volume acquired by one or more seismic surveys.

In Block 720, an elevation correction is determined for a seismic trace in accordance with one or more embodiments. In some embodiments, an elevation correction is needed before stacking seismic traces in response to differences in elevation (e.g., for land seismic data). As illustrated in FIGS. 3B and 4B above, different seismic receivers and seismic sources may be located at different elevations. As such, seismic sources and seismic receivers may need to be referenced to a common data domain before stacking traces in order to accurately model the subsurface. This operation may be performed with various approaches, such as statics corrections (i.e., vertical travel path time shift), or redatuming (e.g., using wave-based processes for moving the seismic trace to the datum plane). In some embodiments, the reference data domain is selected by a user input to a user device. In various situations, the local velocity may need to be known a-priori.

In some embodiments, for example, a horizontal datum plane may be used as a reference data domain whose X-Y-Z position coincides with the center of a particular virtual trace bin. Likewise, elevation of seismic sources and seismic receivers may be inferred using an interpolation process from nearby source-receiver positions. Using a velocity of the respective pressure wave, a time shift may be applied to each seismic trace within a virtual trace bin by assuming a vertical travel path from an actual source/receiver position to the horizontal datum plane. This elevation correction may correspond to a static correction or a phase shift. Additional corrections may be applied to a seismic trace with a residual component of the time shift (which may be referred to as a "residual static" or "residual phase shift") that is calculated with surface-consistent.

In Block 730, a bin correction is determined for a seismic trace based on a position of a seismic trace within a virtual trace bin in accordance with one or more embodiments. For example, a bin correction may be based on differences in offset amongst seismic traces within a virtual trace bin. Stacked seismic traces may also display an position-related time delay. Such time delays may become bigger as the physical dimensions (i.e., coverage area) of the bin increases. In other words, seismic traces at slightly different distances from a seismic source may need compensation to account for the differences in travel times. In some embodiments, for example, a Linear Move Out (LMO) is determined for a virtual trace bin. An LMO value may compensate the difference in bin location for various LMO seismic events such as diving waves that may not be properly corrected for reflected events, especially at a short difference in position.

In some embodiments, a bin correction is performed using a slant stack technique. For example, various ray parameters may be determined for seismic traces within a virtual trace bin. The ray parameters may be derived from knowledge of the local near surface velocity obtained with various seismic preprocessing steps. For relatively small virtual trace bins, the moveout of seismic events in the virtual trace bin may have a small amount of curvature. Likewise, refracted events may have zero curvature (i.e. refracted waves may have exactly linear moveout) and reflection events may be almost linear, with small amounts of curvature. Using small virtual trace bins, the seismic traces belonging to a virtual trace bin may experience the same velocity. Thus, seismic traces may have signatures of pressure waves traveling from approximately the same origin (i.e., seismic source) to almost the same destination (i.e., seismic receiver).

In some embodiments, a discrete set of ray parameters are determined for performing a bin correction on one or more seismic traces. Input parameters of a seismic trace may include two-way traveltime values represented as t and a half-offset represented as h. Ray parameters may be determined using the following equation:

$$p_j = \frac{j}{c(n_p - 1)}, j = 0, 1, \ldots, n_p - 1 \qquad \text{Equation 1}$$

where $p_j$ corresponds to a ray parameter, j corresponds to a particular seismic trace, and a value c corresponds to an estimated near surface velocity at the center of the virtual trace bin. The parameter $n_p$ may be a value that controls the discretization of the ray parameters. The resulting ray parameters may then lie in the interval $$\left[0, \frac{1}{c}\right],$$

thereby allowing moveout corrections to be handled with apparent velocities in the range [c, +∞]. In some embodiments, various ray parameters are determined by estimating the range of apparent velocities in the seismic events within a virtual trace bin.

In some embodiments, a linear Radon transform is used to transform the seismic traces (in time-offset domain) into slant-stack traces for a bin correction. In some embodiments, the seismic traces are transformed using the following equation:

$$D_j(\tau_k, p_j) = \Sigma_{i=0}^{n_{tr}} w(\bar{x}_i) d_i(\tau_k + p_j \bar{x}_i, \bar{x}_i). \qquad \text{Equation 2}$$

where $d_i$ corresponds to a seismic trace in the time domain, $D_j$ is the seismic trace contribution in the Radon domain, $p_j$ is a ray parameter at trace j, $\tau_k$ is a two-way intercept time, $\bar{x}$ is the offset at the center of a virtual trace bin, and $w(\bar{x}_i)$ is a particular weight based on the offset. The set of transformed contributions $D_j$ may form a slant-stack gather. Two-way intercept time $T_k$ may be determined using the following equation:

$$\tau_k = k\delta t \qquad \text{Equation 3}$$

where t is the two-way traveltime, δ is a Dirac delta function, and k corresponds to a particular seismic time sample. The optional weight $w(\bar{x}_i)$ may act as a user-chosen tapering factor that may take the form of Gaussian weighting. The weight may be determined using the following equation:

$$w(\bar{x}_i) = \exp\left(-\frac{1}{2}\left(\frac{\bar{x}_i}{\sigma \bar{x}}\right)^2\right), 0 < \sigma \le 0.5. \qquad \text{Equation 4}$$

In some embodiments, $w(x_i)=1$. where tapering is not desired. Accordingly, $d_k(t_k, x_i)$ may be the k-th time sample ($t_k=k\delta t$, k=0, 1, ..., $n_s-1$) of the i-th seismic trace in a virtual trace bin with an offset $x_i$, i=0, 1, ..., $n_{tr}-1$. Here δt is the time sampling interval, $n_s$ is the number of time samples and $n_{tr}$ the bin fold.

In some embodiments, various slant-stack traces (e.g., seismic traces transformed using a linear Radon transform) are summed in order to determine a final virtual trace for this particular virtual trace bin. For example, the final virtual trace for a virtual trace bin may be determined using the following equation:

$$\bar{D}(t_k, \bar{x}) = \Sigma_{j=0}^{n_p} M_j(\tau_k, p_j) D_j(\tau_k, p_j), \qquad \text{Equation 5}$$

where $M_j$ is a mask in the Radon domain that is excluding from the summation the less energetic contributions of $D_j$, where the noise is predominant.

This output trace of Equation 5 may be placed at the center of the virtual trace bin as the corresponding virtual trace. As such, $\tau_k + p_j \bar{x}_i$ may not be an integer multiple of δt, or, in other words, it may not refer to an existing time sample of seismic trace $d_i$. The value of such samples may be generated by interpolation, e.g. linear interpolation. Likewise, the entire method may be efficiently implemented in the frequency domain, with the time shifts implemented as linear phase shifts.

Turning to FIGS. 8A, 8B, 8C, and 9, FIGS. 8A, 8B, 8C, and 9 provide examples of generating a virtual trace using linear moveout corrections and corrections in a Radon domain in accordance with one or more embodiments. The following examples are for explanatory purposes only and not intended to limit the scope of the disclosed technology.

Figures 8A, 8B, 8C:
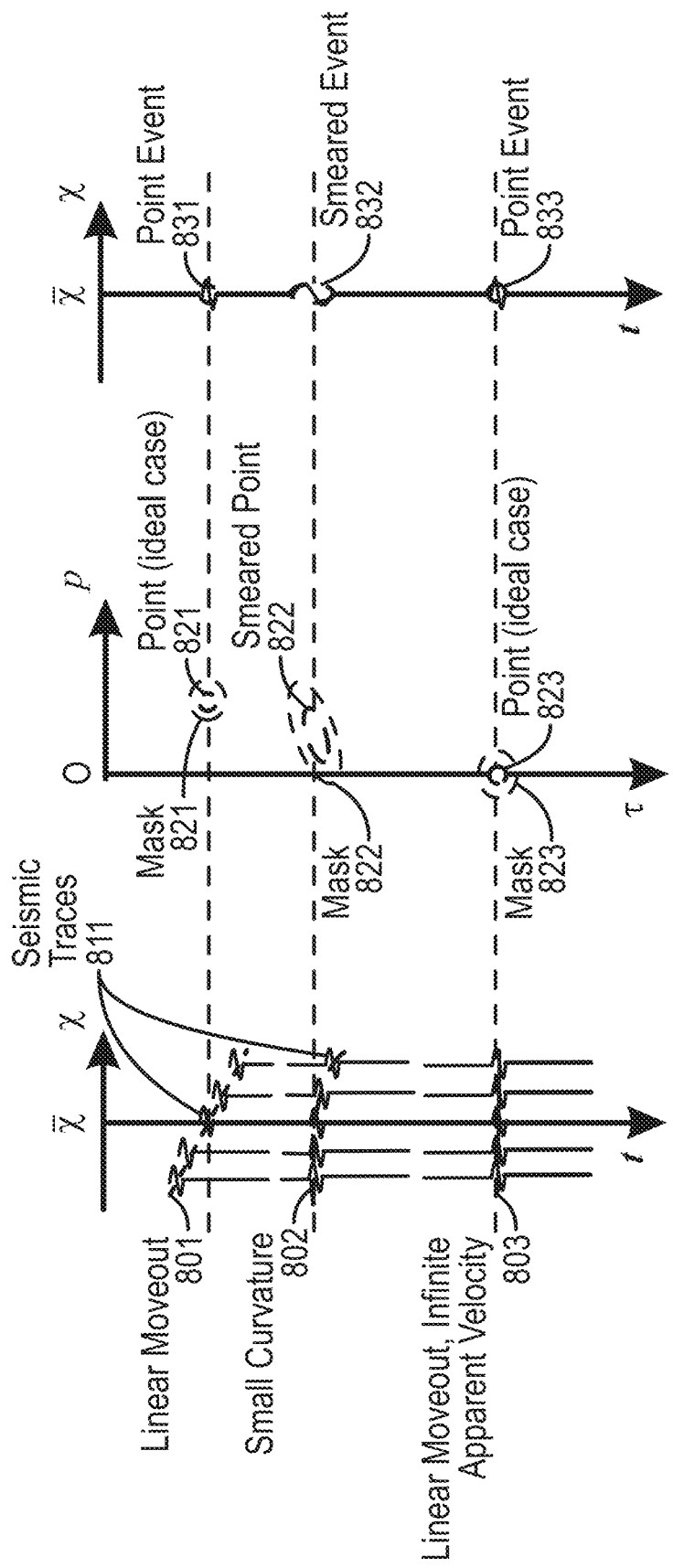
FIGS. 8A, 8B, 8C, and 9 show examples in accordance with one or more embodiments.
Figure 9:
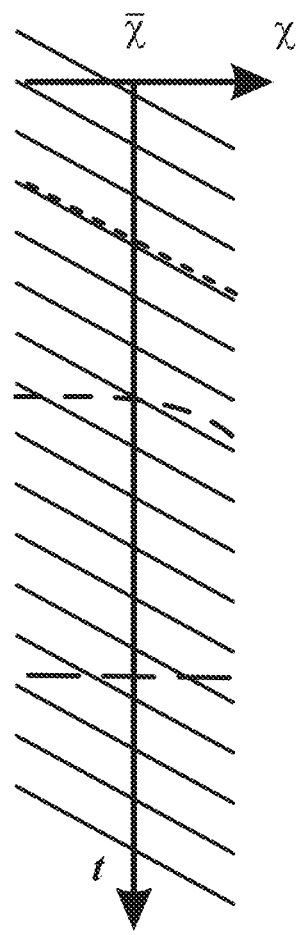
Figure 9:
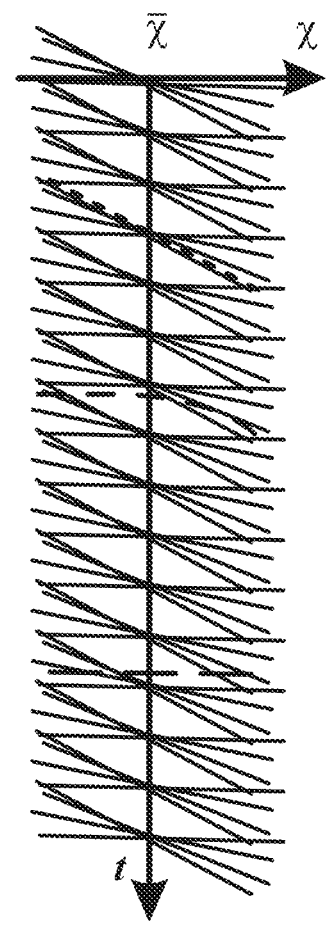

Turning to FIGS. 8A, 8B, and 8C, FIGS. 8A, 8B, and 8C show a schematic diagram of FIG. 7 in accordance with one or more embodiments. In FIG. 8A, the vertical signals are seismic traces (811), which correspond to the information propagated from a seismic source to a seismic receiver and represented as a function of time. FIG. 8A illustrates a collection of seismic traces (shown at different offsets, i.e., distances between seismic sources and seismic receivers) thus forming a gather. Within the gather in FIG. 8A, various events are shown corresponding to the subsurface geology and identified as a continuous pattern between adjacent offsets (i.e., event exist in the offset-time domain). In particular, FIG. 8A shows a linear moveout (801), a small curvature (802), and a linear moveout having infinite apparent velocity (803). Using the gather of seismic traces (offset-time), the seismic transform are transformed into various traces in another domain (e.g., the tau-p domain) in FIG. 8B. Thus, the events (801, 802, 803) are mapped in a different way as a point (821), a smeared point (822), and a point (823), which may be more easily manipulated than in an offset-time domain. In the tau-p domain in FIG. 8B, masking is applied to the transformed traces (e.g., to isolate the most energetic components of the events) as shown by mask (821), mask (822), and mask (823). Afterwards, stacking is performed on the traces in the tau-p domain to produce respective virtual traces for various events in FIG. 8C (i.e., illustrated as a point event (831), a smeared event (832), and a point event (833)). For example, the smeared event (832) is shown as being smeared along t, but with less smear than the signal obtained using an LMO+stack. In other words, a virtual trace generation function may simply be a summation of all the tau-p relevant contributions over the p axis to form a stack. Thus, the virtual traces in FIG. 8C may have an increased signal to noise ratio. Accordingly, these data processing operations have the effect of mapping only the most energetic contribution of the events back to the offset-time domain in the form of a single virtual trace as shown in FIG. 8C. In particular, FIG. 9 shows a comparison between summation paths based on the linear moveout corrections and slant-stack corrections for the linear moveout (801), the small curvature (802), and a linear moveout event with an infinite applied velocity (803).

Returning to FIG. 7, in Block 740, a weight is determined for a seismic trace in accordance with one or more embodiments. In some embodiments, different seismic traces within a virtual trace bin may be weighted in the summation for producing a virtual trace. For example, a Gaussian tapering may be used in a stacking operation to provide more weight to traces located closer to a beam center of a virtual trace and progressively reduce the weight of seismic traces as the distance from the center increases. However, while weights may be determined as part of an elevation correction or bin corrections, weights may also be used in other virtual trace processing, such as noise reductions.

In some embodiments, various weighted traces are determined within a virtual trace bin using a predetermined weight distribution. For example, the predetermined weight distribution may assign a larger weight value to a respective seismic trace closer to a beam center of a seismic survey than other seismic traces. The predetermined weight distribution may be defined as various weight values (e.g., a vector or a function of distance or other parameters for determining weights). Likewise, weight values may change based on a predetermined increment as a function of distance from the beam center.

In Block 750, an adjusted seismic trace is determined based on a seismic trace and using an elevation correction, a bin correction, and/or a weight in accordance with one or more embodiments. More specifically, various adjusted seismic traces may determine by applying one or more elevation corrections or one or more bin corrections to seismic traces in a virtual trace bin. In some embodiments, for example, the adjusted seismic trace is a slant-stack trace similar to the slant-stack traces described in Block 730 and FIGS. 8A-8C above and the accompanying description.

In Block 760, a virtual trace is generated based on various adjusted seismic traces in accordance with one or more embodiments. Thus, adjusted and non-adjusted seismic traces may be combined in a virtual trace generation function, e.g., by a summation process. The virtual trace may then be used for generating one or more virtual shot gathers as described above in FIG. 5 and the accompanying description.

Figure 10:
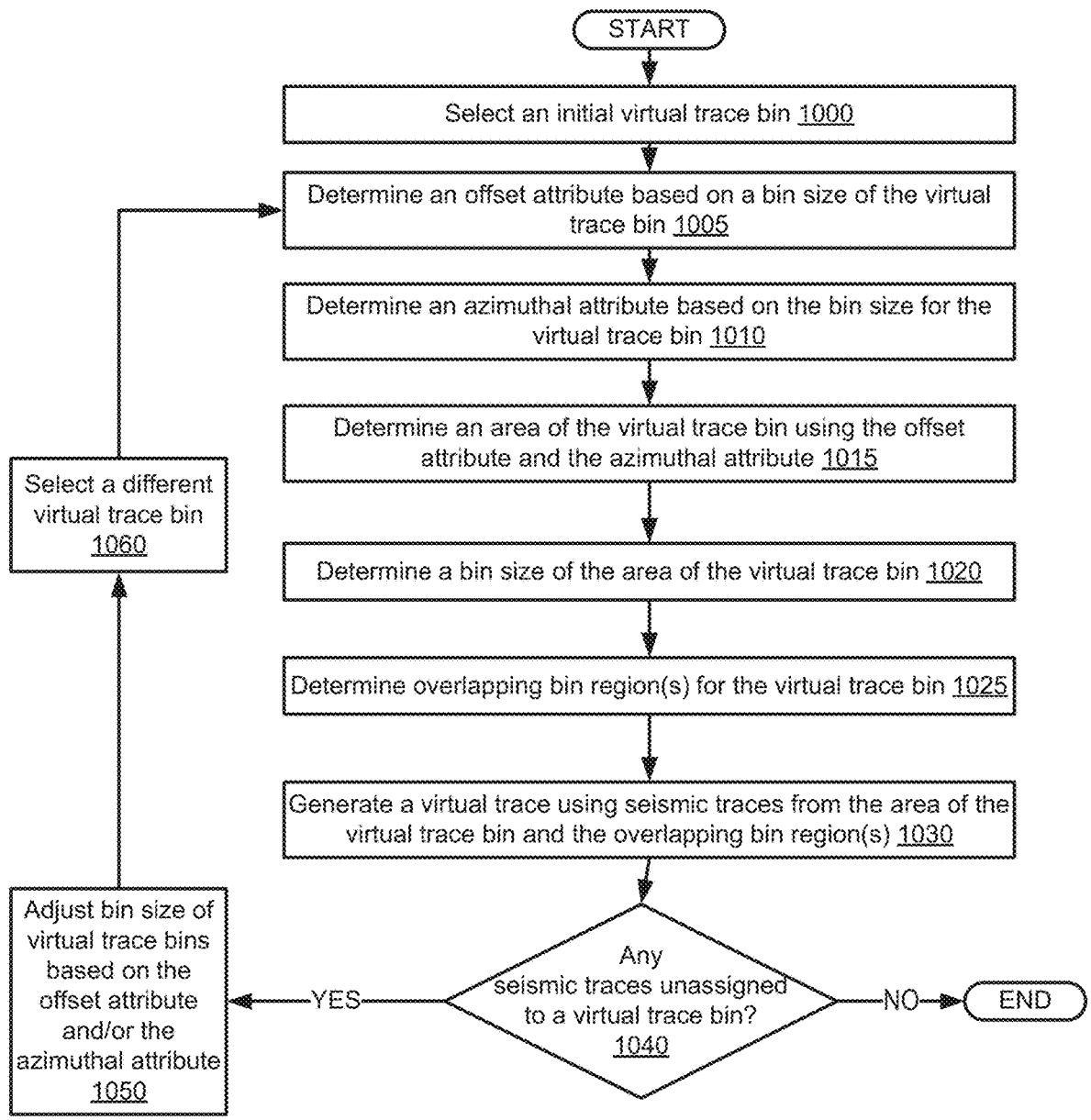
FIG. 10 shows a flowchart in accordance with one or more embodiments.

Turning to FIG. 10, FIG. 10 shows a flowchart in accordance with one or more embodiments. Specifically, FIG. 10 describes a specific method for managing seismic traces in a virtual trace bin. One or more blocks in FIG. 10 may be performed by one or more components (e.g., seismic interpreter (261)) as described in FIGS. 1, 2, 3A, 3B, 4A, 4B, 6A, and 6B. While the various blocks in FIG. 10 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1000, an initial virtual trace bin is selected in accordance with one or more embodiments. For example, a virtual trace bin may be determined based on various offset attributes and azimuthal attributes. Likewise, a seismic survey may be divided into multiple virtual trace bins, where an initial virtual trace bin is selected. The initial virtual trace bin may be selected as part of an iterative algorithm, e.g., to optimize which seismic traces are assigned to different virtual trace bins.

In Block 1005, an offset attribute is determined based on a bin size for a virtual trace bin in accordance with one or more embodiments.

In Block 1010, an azimuthal attribute is determined based on a bin size for a virtual trace bin in accordance with one or more embodiments.

In Block 1015, an area of a virtual trace bin is determined using an offset attribute and an azimuthal attribute in accordance with one or more embodiments.

In Block 1020, a bin size is obtained for a virtual trace bin in accordance with one or more embodiments. Based on an offset attribute and an azimuthal attribute, a particular number of seismic traces may be associated with a virtual trace bin. Thus, a seismic interpreter may determine the current number of seismic traces in the virtual trace bin as the bin size. In some embodiments, a bin size, one or more offset attributes, and/or one or more azimuthal attributes are based on a user input to a user device (e.g., a personal computer system, a human-machine interface, or other computer device). Thus, a user selection may determine dimensions of a virtual trace bin, e.g., to designate a specific number of seismic traces per bin.

In Block 1025, one or more overlapping bin regions are determined for a virtual trace bin in accordance with one or more embodiments. In some embodiments, overlapping bin regions are determined that partially overlap between two or more adjacent virtual trace bins. For example, overlapping bin regions may be used with Gaussian weighting to enhance the spatial continuity of any generated virtual traces.

Figure 11:
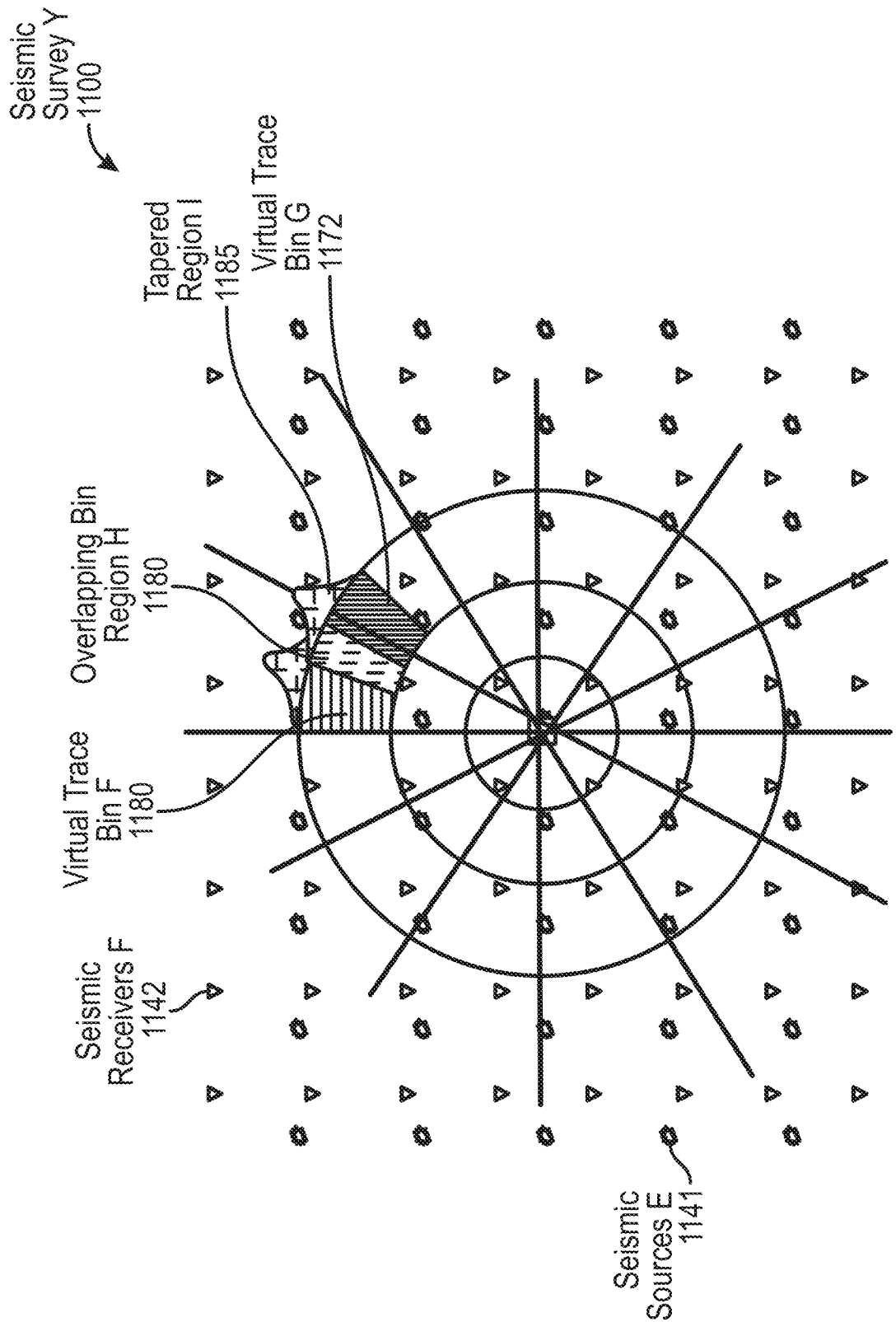
FIGS. 11, 12, and 13 show examples in accordance with one or more embodiments.

Turning to FIG. 11, FIG. 11 provides an example of repartitioning virtual trace bins in accordance with one or more embodiments. The following example is for explanatory purposes only and not intended to limit the scope of the disclosed technology. In FIG. 11, a seismic survey Y (1100) includes various seismic receivers F (1142) and seismic sources E (1141). In particular, the seismic survey Y (1100) is divided into multiple virtual trace bins (e.g., virtual trace bin F (1171) and virtual trace bin G (1172)). Here, an overlapping bin region H (1180) is used by a seismic interpreter (not shown) for generating virtual traces. Thus, both the virtual trace bin F (1171) and the virtual trace bin G (1172) share various seismic traces from the overlapping bin region H (1180). Likewise, a couple tapered regions (e.g., tapered region I (1185)) are shown in FIG. 11 for use in Gaussian weighting for generating respective virtual traces.

In Block 1030, a virtual trace is generated using various seismic traces from an area of a virtual trace bin and one or more overlapping bin regions in accordance with one or more embodiments. The virtual trace generation may be similar as the processes described above in FIGS. 5 and 7 and the accompanying description.

In Block 1040, a determination is made whether any more seismic traces are unassigned to a virtual trace bin in accordance with one or more embodiments. For example, the workflow may be an iterative process until properties are optimized for all virtual trace bins in a seismic survey. When a determination is made that more seismic traces may be assigned to virtual bins, the process may proceed to Block 1060. When a determination is made that all seismic traces and/or virtual trace bins have been generated, the process may end.

In Block 1050, a bin size of various virtual trace bins is adjusted based on an offset attribute and/or an azimuthal attribute in accordance with one or more embodiments. For example, additional partitioning of a virtual trace bin's area may be performed as offset from a common midpoint increases. In particular, a seismic interpreter may use adaptive partitioning where a similar number of seismic traces are maintained among virtual trace bins as offset increases.

In Block 1060, a different virtual trace bin is selected in accordance with one or more embodiments.

Figure 13:
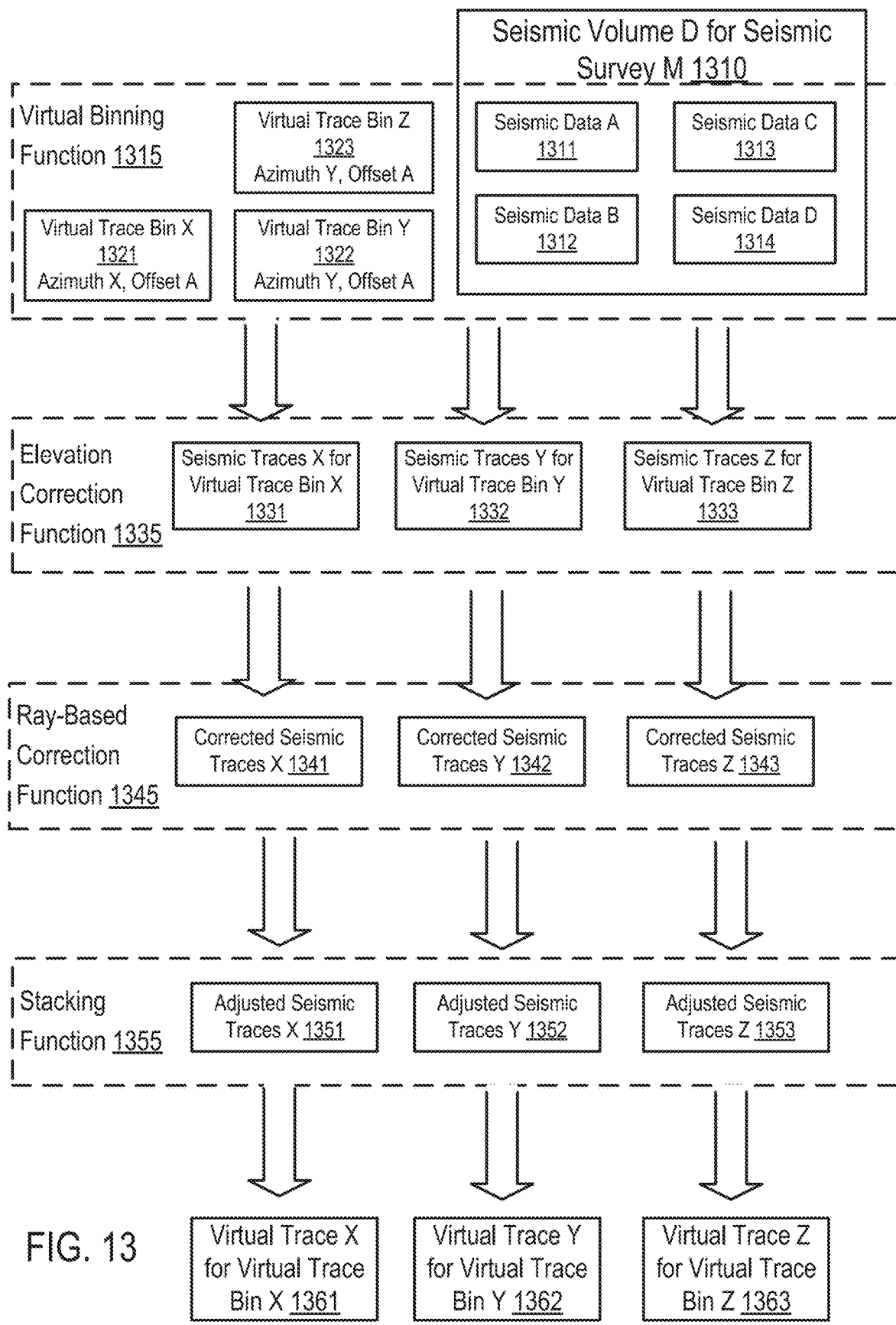

Turning to FIG. 13, FIG. 13 provides an example of generating virtual traces using virtual trace bins in accordance with one or more embodiments. The following example is for explanatory purposes only and not intended to limit the scope of the disclosed technology.

In FIG. 13, a seismic interpreter (not shown) obtains a seismic volume D (1310) for a seismic survey M, where the seismic volume D (1310) includes seismic data A (1311), seismic data B (1312), seismic data C (1313), and seismic data D (1314). The seismic interpreter determines several virtual trace bins, i.e., virtual trace bin X (1321), virtual trace bin Y (1322), and virtual trace bin Z (1323). The virtual trace bins (1321, 1322, 1323) have the same offset (i.e., offset A) from a common midpoint, but different azimuthal attributes. In particular, virtual trace bin X (1321) is disposed at azimuth X, virtual trace bin Y (1322) is disposed at azimuth Y, and virtual trace bin Z (1323) is disposed at azimuth Z. Using a virtual binning function (1315), the seismic interpreter sorts various seismic traces within the seismic volume D (1310) to produce the various subsets, i.e., seismic traces X (1331) for virtual trace bin X (1321), seismic traces Y (1332) for virtual trace bin Y (1322), and seismic traces Z (1333) for virtual trace bin Z (1323).

Keeping with FIG. 13, the seismic interpreter applies an elevation correction function (1335) to the seismic traces X (1331), the seismic traces Y (1332), and the seismic traces Z (1333). Resulting from the elevation correction function (1335) are various adjusted or corrected seismic traces, i.e., corrected seismic traces X (1341), corrected seismic traces Y (1342), and corrected seismic traces Z (1343). The seismic interpreter applies a ray-based correction function (1345) to the corrected seismic traces (1341, 1342, 1343) to address different traces being at different distances from the center of the respective virtual trace bins. The ray-based correction function (1345) uses ray parameters associated with the different corrected seismic traces (1341, 1342, 1343) to produce adjusted seismic traces, i.e., adjusted seismic traces X (1351), adjusted seismic traces Y (1352), and adjusted seismic traces (1353). The adjusted seismic traces (1351, 1352, 1353) are inputs to a stacking function (1355) for generating virtual traces. Thus, the seismic interpreter uses the workflow shown in FIG. 13 to produce virtual trace X (1361), virtual trace Y (1362), and virtual trace Z (1363).

In some embodiments, virtual traces pertaining to a virtual trace bin (e.g., an XYOA bin) may be ray-corrected and stacked at the same time. In practice, the operation may be performed by stacking seismic traces along certain trajectories (e.g. using a linear Radon/slant stack). Afterwards, another stacking process is performed where stacking occurs in the Radon domain by integrating along the ray parameter to generate a virtual trace (i.e., a time domain pilot trace).

Computer System

Figure 14:
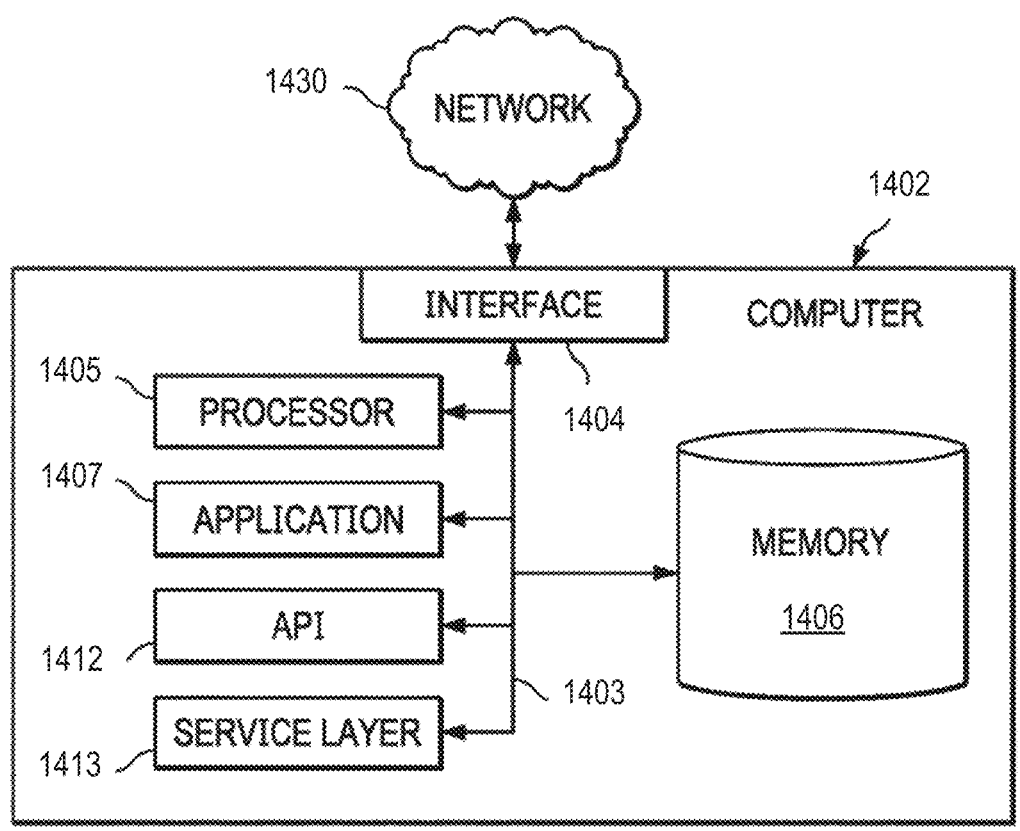
FIG. 14 shows a computing system in accordance with one or more embodiments.

Embodiments may be implemented on a computer system. FIG. 14 is a block diagram of a computer system used to provide computational functionalities associated with described algorithms, methods, functions, processes, flows, and procedures as described in the instant disclosure, according to an implementation. The illustrated computer (1402) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1402) may include a computer that includes an input device, such as a keypad, keyboard, touch screen, or other device that can accept user information, and an output device that conveys information associated with the operation of the computer (1402), including digital data, visual, or audio information (or a combination of information), or a GUI.

The computer (1402) can serve in a role as a client, network component, a server, a database or other persistency, or any other component (or a combination of roles) of a computer system for performing the subject matter described in the instant disclosure. The illustrated computer (1402) is communicably coupled with a network (1430) or cloud. In some implementations, one or more components of the computer (1402) may be configured to operate within environments, including cloud-computing-based, local, global, or other environment (or a combination of environments).

At a high level, the computer (1402) is an electronic computing device operable to receive, transmit, process, store, or manage data and information associated with the described subject matter. According to some implementations, the computer (1402) may also include or be communicably coupled with an application server, e-mail server, web server, caching server, streaming data server, business intelligence (BI) server, or other server (or a combination of servers).

The computer (1402) can receive requests over network (1430) or cloud from a client application (for example, executing on another computer (1402)) and responding to the received requests by processing the said requests in an appropriate software application. In addition, requests may also be sent to the computer (1402) from internal users (for example, from a command console or by other appropriate access method), external or third-parties, other automated applications, as well as any other appropriate entities, individuals, systems, or computers.

Each of the components of the computer (1402) can communicate using a system bus (1403). In some implementations, any or all of the components of the computer (1402), both hardware or software (or a combination of hardware and software), may interface with each other or the interface (1404) (or a combination of both) over the system bus (1403) using an application programming interface (API) (1412) or a service layer (1413) (or a combination of the API (1412) and service layer (1413). The API (1412) may include specifications for routines, data structures, and object classes. The API (1412) may be either computer-language independent or dependent and refer to a complete interface, a single function, or even a set of APIs. The service layer (1413) provides software services to the computer (1402) or other components (whether or not illustrated) that are communicably coupled to the computer (1402). The functionality of the computer (1402) may be accessible for all service consumers using this service layer. Software services, such as those provided by the service layer (1413), provide reusable, defined business functionalities through a defined interface. For example, the interface may be software written in JAVA, C++, or other suitable language providing data in extensible markup language (XML) format or other suitable format. While illustrated as an integrated component of the computer (1402), alternative implementations may illustrate the API (1412) or the service layer (1413) as stand-alone components in relation to other components of the computer (1402) or other components (whether or not illustrated) that are communicably coupled to the computer (1402). Moreover, any or all parts of the API (1412) or the service layer (1413) may be implemented as child or sub-modules of another software module, enterprise application, or hardware module without departing from the scope of this disclosure.

The computer (1402) includes an interface (1404). Although illustrated as a single interface (1404) in FIG. 14, two or more interfaces (1404) may be used according to particular needs, desires, or particular implementations of the computer (1402). The interface (1404) is used by the computer (1402) for communicating with other systems in a distributed environment that are connected to the network (1430). Generally, the interface (1404 includes logic encoded in software or hardware (or a combination of software and hardware) and operable to communicate with the network (1430) or cloud. More specifically, the interface (1404) may include software supporting one or more communication protocols associated with communications such that the network (1430) or interface's hardware is operable to communicate physical signals within and outside of the illustrated computer (1402).

The computer (1402) includes at least one computer processor (1405). Although illustrated as a single computer processor (1405) in FIG. 14, two or more processors may be used according to particular needs, desires, or particular implementations of the computer (1402). Generally, the computer processor (1405) executes instructions and manipulates data to perform the operations of the computer (1402) and any algorithms, methods, functions, processes, flows, and procedures as described in the instant disclosure.

The computer (1402) also includes a memory (1406) that holds data for the computer (1402) or other components (or a combination of both) that can be connected to the network (1430). For example, memory (1406) can be a database storing data consistent with this disclosure. Although illustrated as a single memory (1406) in FIG. 14, two or more memories may be used according to particular needs, desires, or particular implementations of the computer (1402) and the described functionality. While memory (1406) is illustrated as an integral component of the computer (1402), in alternative implementations, memory (1406) can be external to the computer (1402).

The application (1407) is an algorithmic software engine providing functionality according to particular needs, desires, or particular implementations of the computer (1402), particularly with respect to functionality described in this disclosure. For example, application (1407) can serve as one or more components, modules, applications, etc. Further, although illustrated as a single application (1407), the application (1407) may be implemented as multiple applications (1407) on the computer (1402). In addition, although illustrated as integral to the computer (1402), in alternative implementations, the application (1407) can be external to the computer (1402).

There may be any number of computers (1402) associated with, or external to, a computer system containing computer (1402), each computer (1402) communicating over network (1430). Further, the term "client," "user," and other appropriate terminology may be used interchangeably as appropriate without departing from the scope of this disclosure. Moreover, this disclosure contemplates that many users may use one computer (1402), or that one user may use multiple computers (1402).

In some embodiments, the computer (1402) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
   obtaining, by a computer processor, a plurality of seismic traces for a geological region of interest;
   determining, by the computer processor, a first offset attribute, a second offset attribute, a first azimuthal attribute, and a second azimuthal attribute;
   determining, by the computer processor and using the first offset attribute and the first azimuthal attribute, a first virtual trace bin for the geological region of interest;
   determining, by the computer processor and using the second offset attribute and the second azimuthal attribute, a second virtual trace bin for the geological region of interest,
      wherein the first azimuthal attribute and the second azimuthal attribute are different,
      wherein the first virtual trace bin and the second virtual trace bin comprise an overlapping bin region that comprises a plurality of overlapping traces among the plurality of seismic traces that are disposed in the first virtual trace bin and the second virtual trace bin, and
      wherein the first virtual trace bin comprises a first subset of the plurality of seismic traces that are not disposed in the second virtual trace bin;
   determining, by the computer processor, a plurality of ray parameters for the first virtual trace bin, wherein a respective ray parameter among the plurality of ray parameters corresponds to a respective seismic trace in the first virtual trace bin;
   determining, by the computer processor, a plurality of adjusted seismic traces using a linear Radon transform, the plurality of ray parameters, the first subset of the plurality of seismic traces, and the plurality of overlapping traces;
   generating, by the computer processor, a first virtual trace using the plurality of adjusted seismic traces;
   generating, by the computer processor, a second virtual trace using the plurality of overlapping traces and a second subset of the plurality of seismic traces corresponding to the second virtual trace bin;
   generating, by the computer processor, a velocity model for the geological region of interest using a virtual shot gather comprising the first virtual trace, the second virtual trace, and a plurality of virtual traces, wherein a respective virtual trace among the plurality of virtual traces corresponds to a respective virtual trace bin among a plurality of virtual trace bins;
   generating, by the computer processor, a seismic image of the geological region of interest using the velocity model; and
   determining, by the computer processor and using the seismic image, a presence of hydrocarbons within the geological region of interest.

2. The method of claim 1, further comprising:
   determining, by the computer processor, an elevation correction using a first elevation value for a seismic receiver and a second elevation value for a seismic source, wherein the seismic receiver and the seismic source correspond to a seismic trace among the plurality of seismic traces; and
   determining, by the computer processor, an adjusted seismic trace based on the seismic trace and the elevation correction,
   wherein the first virtual trace is generated using the adjusted seismic trace.

3. The method of claim 2, wherein the elevation correction is a static correction based on vertical travel time path shift.

4. The method of claim 2, further comprising:
   determining, by the computer processor, a reference data domain, wherein the reference data domain is a Radon domain or a wave-based data domain,
   wherein the adjusted seismic trace is corrected using the first elevation value and the second elevation value in the reference data domain.

5. The method of claim 1, further comprising:
   determining, by the computer processor, a linear moveout (LMO) value for the first virtual trace bin;
   determining, by the computer processor, a bin correction using the LMO value; and
   determining a plurality of adjusted seismic traces using the bin correction and the first subset of the plurality of seismic traces, and
   wherein the first virtual trace is generated using the plurality of adjusted seismic traces.

6. The method of claim 1, further comprising:
   determining, by the computer processor, a third virtual trace bin,
   wherein the third virtual trace bin has an offset greater than the second virtual trace bin, and
   wherein the third virtual trace bin corresponds to a third subset of the plurality of seismic traces; and
   adjusting, by the computer processor, a size of the third virtual trace bin to produce a number of traces in the second subset to match a number of traces in the third subset.

7. The method of claim 1, further comprising:
   determining, by the computer processor, a plurality of weighted traces based on the first subset of the plurality of seismic traces and a predetermined weight distribution,
   wherein the predetermined weight distribution assigns a larger weight value to a respective seismic trace among the first subset closer to a beam center of a seismic survey,
   wherein the predetermined weight distribution has a plurality of weight values change based on a predetermined increment as a function of distance from the beam center, and
   wherein the first virtual trace is based on stacking the plurality of weighted traces.

8. The method of claim 1, further comprising:
   determining, by the computer processor, a third virtual trace bin,
   determining, by the computer processor, a plurality of weighted traces based on a third subset of the plurality of seismic traces in the third virtual trace bin and a predetermined weight distribution,
   wherein the predetermined weight distribution corresponds to Gaussian tapering, and
   wherein a third virtual trace is generated using the plurality of weighted traces.

9. The method of claim 1, further comprising:
obtaining, by the computer processor, a user input from a user device,
wherein the user input determines the plurality of overlapping traces between the first subset and the second subset.

10. A system, comprising:
a seismic surveying system comprising a seismic source and a plurality of seismic receivers; and
a seismic interpreter comprising a computer processor, wherein the seismic interpreter is coupled to the seismic surveying system, the seismic interpreter being configured to perform a method comprising:
obtaining a plurality of seismic traces for a geological region of interest;
determining a first offset attribute, a second offset attribute, a first azimuthal attribute, and a second azimuthal attribute;
determining, using the first offset attribute and the first azimuthal attribute, a first virtual trace bin for the geological region of interest;
determining, using the second offset attribute and the second azimuthal attribute, a second virtual trace bin for the geological region of interest,
wherein the first azimuthal attribute and the second azimuthal attribute are different,
wherein the first virtual trace bin and the second virtual trace bin comprise an overlapping bin region that comprises a plurality of overlapping traces among the plurality of seismic traces that are disposed in the first virtual trace bin and the second virtual trace bin, and
wherein the first virtual trace bin comprises a first subset of the plurality of seismic traces that are not disposed in the second virtual trace bin;
determining a plurality of ray parameters for the first virtual trace bin, wherein a respective ray parameter among the plurality of ray parameters corresponds to a respective seismic trace in the first virtual trace bin;
determining a plurality of adjusted seismic traces using a linear Radon transform, the plurality of ray parameters, the first subset of the plurality of seismic traces, and the plurality of overlapping traces;
generating a first virtual trace using the plurality of adjusted seismic traces;
generating a second virtual trace using the plurality of overlapping traces and a second subset of the plurality of seismic traces corresponding to the second virtual trace bin;
generating a velocity model for the geological region of interest using a virtual shot gather comprising the first virtual trace, the second virtual trace, and a plurality of virtual traces, wherein a respective virtual trace among the plurality of virtual traces corresponds to a respective virtual trace bin among a plurality of virtual trace bins;
generating a seismic image of the geological region of interest using the velocity model; and
determining, using the seismic image, a presence of hydrocarbons within the geological region of interest.

11. The system of claim 10, wherein the method further comprises:
determining an elevation correction using a first elevation value for a seismic receiver and a second elevation value for a seismic source, wherein the seismic receiver and the seismic source correspond to a seismic trace among the plurality of seismic traces; and
determining an adjusted seismic trace based on the seismic trace and the elevation correction,
wherein the first virtual trace is generated using the adjusted seismic trace.

12. The system of claim 11, wherein the method further comprises:
determining a reference data domain, wherein the reference data domain is a Radon domain or a wave-based data domain,
wherein the adjusted seismic trace is corrected using the first elevation value and the second elevation value in the reference data domain.

13. The system of claim 10, wherein the method further comprises:
determining a linear moveout (LMO) value for the first virtual trace bin;
determining a bin correction using the LMO value; and
determining a plurality of adjusted seismic traces using the bin correction and the first subset of the plurality of seismic traces, and
wherein the first virtual trace is generated using the plurality of adjusted seismic traces.

14. The system of claim 10, wherein the method further comprises:
determining a third virtual trace bin,
wherein the third virtual trace bin has an offset greater than the second virtual trace bin, and
wherein the third virtual trace bin corresponds to a third subset of the plurality of seismic traces; and
adjusting a size of the third virtual trace bin to produce a number of traces in the second subset to match a number of traces in the third subset.

15. The system of claim 10, wherein the method further comprises:
obtaining a user input from a user device; and
wherein the user input determines a plurality of overlapping traces between the first subset and the second subset.

16. A non-transitory computer readable medium storing instructions executable by a computer processor, the instructions comprising functionality for:
obtaining a plurality of seismic traces for a geological region of interest;
determining a first offset attribute, a second offset attribute, a first azimuthal attribute, and a second azimuthal attribute;
determining, using the first offset attribute and the first azimuthal attribute, a first virtual trace bin for the geological region of interest;
determining, using the second offset attribute and the second azimuthal attribute, a second virtual trace bin for the geological region of interest,
wherein the first azimuthal attribute and the second azimuthal attribute are different,
wherein the first virtual trace bin and the second virtual trace bin comprise an overlapping bin region that comprises a plurality of overlapping traces among the plurality of seismic traces that are disposed in the first virtual trace bin and the second virtual trace bin, and
wherein the first virtual trace bin comprises a first subset of the plurality of seismic traces that are not disposed in the second virtual trace bin;
determining a plurality of ray parameters for the first virtual trace bin, wherein a respective ray parameter among the plurality of ray parameters corresponds to a respective seismic trace in the first virtual trace bin;

determining a plurality of adjusted seismic traces using a linear Radon transform, the plurality of ray parameters, the first subset of the plurality of seismic traces, and the plurality of overlapping traces;

generating a first virtual trace using the plurality of adjusted seismic traces;

generating a second virtual trace using the plurality of overlapping traces and a second subset of the plurality of seismic traces corresponding to the second virtual trace bin;

generating a velocity model for the geological region of interest using a virtual shot gather comprising the first virtual trace, the second virtual trace, and a plurality of virtual traces, wherein a respective virtual trace among the plurality of virtual traces corresponds to a respective virtual trace bin among a plurality of virtual trace bins;

generating a seismic image of the geological region of interest using the velocity model; and determining, using the seismic image, a presence of hydrocarbons within the geological region of interest.

* * * * *